United States Patent [19]
Imase et al.

[11] Patent Number: 6,038,277
[45] Date of Patent: Mar. 14, 2000

[54] PLANT OPERATION APPARATUS

[75] Inventors: Masahiro Imase; Hiroki Okamoto; Katsumi Akagi; Hozumi Kadohara, all of Tokyo, Japan

[73] Assignee: Mitsubishi Denki Kabushiki Kaisha, Tokyo, Japan

[21] Appl. No.: 08/934,144

[22] Filed: Sep. 19, 1997

[30] Foreign Application Priority Data

Mar. 21, 1997 [JP] Japan ................................... 9-068837

[51] Int. Cl.[7] ................................................. G21C 17/00
[52] U.S. Cl. ........................................... 376/259; 364/146
[58] Field of Search .................................... 376/215, 216, 376/259; 364/146, 188, 528.21

[56] References Cited

U.S. PATENT DOCUMENTS

| | | | |
|---|---|---|---|
| 5,621,776 | 4/1997 | Gaubatz | 376/259 |
| 5,745,539 | 4/1998 | Lang | 376/259 |

OTHER PUBLICATIONS

"IEEE Standard Criteria for Independence of Class IE Equipment and circuits." The Institute of Electrical and Electronics Engineers, Inc., 1981 (pp. 1–19).

*Primary Examiner*—Daniel D. Wasil
*Assistant Examiner*—M. J. Lattig
*Attorney, Agent, or Firm*—Leydig, Voit & Mayer, Ltd.

[57] ABSTRACT

A plant operation apparatus for satisfying a separation criteria includes an operation panel, an operation display screen control device for controlling a display on the operation panel and a touch operation and for selecting a train in a software selection function based on the operation signal from the operation panel, a selection device having momentary push buttons and for resetting other push buttons in a hardware train selection function when an operator pushes one of the push buttons to select a train, and for outputting a control signal to select the train corresponding to the button pushed by the operator. The plant operation apparatus realizes the train selection system having multiplicity, diversity, and independence for satisfying the separation criteria.

20 Claims, 18 Drawing Sheets

PLANT OPERATION APPARATUS

BACKGROUND OF THE INVENTION

1. Field of the Invention

The present invention relates to a plant apparatus operated by touch operation.

2. Description of the Prior Art

Because there is a requirement to maintain safety functions (that is, based on a single failure criteria) of safety system equipment for an atomic power plant or a nuclear power plant as a plant operation apparatus, even if a single failure occurs in any devices or channels forming the plant operation apparatus, it must be required that the safety system equipments for the atomic power plant are the equipments, each is physically separated, electrically isolated, and independently from other equipments, systems, and multiplicity systems.

For example, there is the literature 1 as one of conventional examples that satisfy the requirement of the safety protection function described above.

Literature 1: "Development of the BWR safety protection system with a new digital control system", IAEA International system on nuclear power plant instrument and control, TOKYO, Japan, pp. 18–22, May, 1992.

FIGS. 1A–B are a pictorial view and a diagram showing a configuration of a conventional safety system including touch operated equipment shown in the literature 1 described above. In FIG. 1(b), the reference numbers 152, 153, 154, and 155 designate train control devices as separated into four sections in order to control the operation of trains. That is, the configuration of the conventional safety protection system comprises the four trains. In FIG. 1(a) the reference number 159 designates a central control panel having a plurality of flat displays corresponding to the train control devices DIV-1, DIV-2, DIV-3, and DIV-4, respectively. Each of the trains 152 to 155 is physically separated by the separation means 151.

Because the safety protection equipment in the conventional system shown in FIG. 1(a) and 1(b) has the configuration described above, the supervision operation devices, to be separated to each other, in the central control panel 159 such as flat display panels (FDP) and the like must have the configuration in which they are completely and physically separated like the safety protection system downstream from the flat display panels in order to satisfy the separation criteria. It must be required to independently install a flat display panel in each train as the supervision operation panel, as it is described in FIG. 1(b) as "to DIV-1 flat display", for example. Thus, the supervision operation panel is divided independently for each train. Thereby, there is a drawback in the conventional plant operation apparatus that the operation efficiency of operators decreases and the scale or size of the system increases.

The conventional example shown in FIG. 1(b) must require at least three flat displays, or it must require at least six flat displays when two flat displays are installed in each train because each train requires at least one flat display for the use of the supervision operation.

In addition to the separated flat displays described above, the multiplicity equipment and the switching devices to be required for increasing the reliability and for easy maintenance are commonly and widely used in conventional apparatuses. For example, Japanese patent publication number JP-B-62/75704 discloses a conventional control apparatus.

FIG. 2 is a block diagram showing the conventional process control apparatus disclosed in Japanese patent publication number JP-B-62/75704 described above. In this process control apparatus, when an operator operates the operation panel 111, the auxiliary control unit 110 and control units 101, 102, and 103 forming the multiplicity control unit generate operation signals and output them through lines L11, L12, L13, L14, and other wires to a field panel 100, an electrical instrument unit 400, an annunciator 500, and other control units. Thereby, a switch unit 202 switches back and forth between the output signal transferred from the control multiplicity unit and the output signal transferred from the auxiliary control unit 110. The selected output signal is transferred to the process 300 through the wire L2. It is thereby possible to increase the efficiency of the maintenance operation and the reliability. That is, because the conventional control device 100 has the configuration as shown in FIG. 2, the control device 100 can execute normally and can output the normal output operation signal to the process 300 even if one of the control units 101, 102, and 103 breaks down as a result of errors. Furthermore, when the control function of the control units is renewed, the switch unit 202 can switch the output transferred from the control unit to the output transferred from the auxiliary control unit 110 in order to execute the normal operation.

However, although the conventional commonly used apparatus comprising the control multiplicity units and the switch unit 202 satisfies the general reliability and maintenance criteria to be required commonly, it is difficult and impossible to apply it to a safety system equipment for atomic power plants or nuclear power plants that require a strict single failure criteria (for separation and independence requirement) in the highest safety requirement.

It must be required that the safety system equipment for atomic power plants guarantee the safety protection function when any single failure of component devices occurs. In the conventional example as shown in FIG. 2, there are possibilities of influences from a failure caused when the switch unit 202 breaks down, or to extend to each of the control units 101 to 103 the failure caused when the auxiliary control unit 110 fails, or to lose the safety function caused when all of the functions of the control device 100 fail in a fire. These are drawbacks of the conventional safety protection function.

Like the conventional example described above, because the conventional common multiplicity and switching mechanism can not satisfy the separation criteria for atomic power plants. Accordingly, the conventional safety protection system for atomic power plants comprises at least two or four separated trains (in order to form separated equipments). In addition to this configuration, a desired device or devices are multiplicity in each separated train. That is, the conventional safety protection system is designed by using a multiplicity design method.

FIG. 3 is a diagram showing the conceptual configuration of a train separation based on the conventional multiplicity design method. In the conventional train separation shown in FIG. 3, the supervision operation flat display panels (FDPS) 171 to 174 are integrated into the central control panel 170. Both the FDP 171 and FDP 172 belong to the A train, both FDP 173 and FDP 174 belong to the B train. Each train is separated from other trains for fire protection by the separator as the separation means such as the metal plate and the like in the central control panel 170.

The operation signal transferred from each FDP is transferred to each of the safety protection devices 183 to 186 through the FDP controllers 175 to 178 and the multiplexers (MPX) 179 to 182. The safety protection equipments 183 to 186 operate plant devices in plant processes. All of this equipment placed downstream from the central control panel 170 is divided into trains. The train A and train B are shown in FIG. 3. The control panel includes independent flat display panels 171 to 174 for controlling downstream devices such as the FDP controllers 175 to 178. These devices are not connected to each other in order to protect them from fire and to reduce the effect of any single failure on other devices.

Proper separation devices are provided for devices requiring a cross-over wiring) By using the configuration, even if a component device in the train A fails, the train B can maintain its function and can guarantee its operation. Here, if only one of the train A and the train B has the function required for atomic power plants, it is possible to maintain the plant safety functions for any single failure.

In addition, there is a case that it is required to multiply the configuration of each train. For example, in the conventional example shown in FIG. 2, the FDP controller and the multiplexer and the like are multiplexed. This multiple in the conventional example shown in FIG. 2 is different in conception from the separation design using the train configuration. Therefore the multiple design in each train can be executed by using the conventional reliability analysis method, for example. The supervision operation equipment in the conventional safety system shown in FIG. 1 is designed and formed. In the conventional example shown in FIG. 1, the devices in the apparatus are separated by using three divided trains DIV-1 to DIV-3. In each train, the required parts such as a safety logic unit (SLU) and a digital trip module (DTM) and the like are redundantly included.

Hereinafter, the explanation regarding the general multiple design applied to each of the trains is omitted and conventional drawbacks involved in the conventional method satisfying the train separation to satisfy the single failure criteria, relating to the plant operation apparatus of the present invention, and integrating the supervision operation panel will be explained.

Because the conventional plant operation apparatus has the configuration described above, the following matters (1) to (4) must be required to the touch operation devices in the safety protection equipment in atomic power plant based on the safety design examination guidance, the fire guidance like the safety protection system for an atomic reactor.
(1) Multiplicity or Diversity It is requested to maintain safety functions (namely, the single failure criteria) even if any device forming a system or channel fails. Therefore it must be required for equipment in the safety protection system to have the multiplicity and diversity function.
(2) Independence From the same reason of the case (1) described above, it is requested to design channels forming a system so that the channels are separated from each other and independent from each other as completely for practical applications as possible. Because it is required to electrically isolate devices and to physically separate the devices in the separation satisfying this requirement, the devices to be used for this separation are limited in general.
(3) Separation from measurement control system In order to prevent the influence of failure caused by a general measuring control system that is not adapted to the requirements (1) and (2) described above, it must be necessary to design devices and equipment in the safety protection system in a different way from the measuring control system.

(4) Preventing occurrence of a fire, detection of a fire, and fighting of a fire, and influence of a fire As the countermeasure to reduce the influence of a fire, it is required to separate devices based on a fire-proofing wall, a bulkhead, an interval (distance), and the like.

Because it must be required to separate the supervision operation panel for each train in order to satisfy the separation criteria (the physical separation, the electrical isolation, and the separation to prevent the spreading fire for fire protection), it is thereby necessary to increase the amount of the hardware of the system, the size of the system, the working space for operators, the working time of the operators, the costs of the system, and so on. Accordingly, there is the requirement in the conventional plant operation apparatus, specifically in the atomic power plant field, to increase the operation efficiency of the supervision working, and to obtain the plant operation apparatus that is capable of reducing the cost of the plant operation apparatus by decreasing the hardware size of equipment and devices in the plant operation apparatus under the state in which the separation criteria is satisfied.

SUMMARY OF THE INVENTION

Accordingly, an object of the present invention is, with due consideration to the drawbacks of the conventional plant operation apparatus, to provide a plant operation apparatus whose configuration includes hardware (H/W) selection devices to select trains based on a hardware mechanism in addition to software (S/W) selection system to select the trains based on a software, so that the plant operation apparatus of the present invention has the configuration in which touch operation panels in the safety system is integrated by using the train separation means having the diversity.

An another object of the present invention is to provide a plant operation apparatus that is capable of displaying train selection states to operators in order to process the operations easily and without causing any errors, and of preventing occurrences of any operator errors.

In accordance with a preferred embodiment of the present invention, a plant operation apparatus for satisfying a separation criteria, comprises an operation panel including panel switches for common touch operation, for generating operation signal based on the touch operation by operators, and for transferring the operation signal, an operation display screen control device for controlling a display on the operation panel and the touch operation when one of a plurality of trains as equipments placed in a safety protection system being selected, each train being separated independently in order to keep a multiplicity, a diversity, and an independence of supervision operation devices in the safety protection system, the operation display screen control device for selecting one train based on a software selection function according to the operation signal from the operation panel, and for generating a first control signal for the selected train, a selection device comprising momentary type push buttons corresponding to the trains, for resetting other push buttons other than one push button that being pushed by an operator based on a hardware selection function, and for generating and transferring a second control signal corresponding to the selected train, and a train control device for receiving the first control signal and the second control signal transferred from the operation display screen control device and the selection device, for generating a third control signal for the selected train based on both the first control signal and the second control signal, and for transferring the third control signal to the selected train. In the plant operation apparatus, the operation display screen control device, the selection device, and the train control device forms a diversified train selection system satisfying the separation criteria. It is thereby to prevent an occurrence of a mis-operation.

In the plant operation apparatus as another preferred embodiment of the present invention, the selection device comprises self diagnosis circuits, each self diagnosis circuit corresponds to each train, and the selection device resets the self diagnosis circuits, based on a software logic function, corresponding to the push buttons for other trains, that are not selected when the operator pushes one of the push buttons in order to select one train. It is thereby possible to prevent an occurrence of a mis-operation caused by an operator.

In the plant operation apparatus as another preferred embodiment of the present invention, the selection device further comprises isolators as separation devices corresponding to each train. It is thereby possible to form the train selection system independently from the control device.

In the plant operation apparatus as another preferred embodiment of the present invention, the push buttons incorporated in the selection device are mechanical reset type push buttons, and the mechanical reset type push buttons corresponding to other trains that are not selected are reset mechanically when one train is selected. It is thereby possible to prevent an occurrence of a mis-operation caused by an operator.

In the plant operation apparatus as another preferred embodiment of the present invention, the push buttons incorporated in the selection device are alternate type push buttons, and one alternate type push button corresponding to one train to be selected is pushed after the alternate type push buttons corresponding to other trains that are not selected are reset manually. It is thereby possible to prevent an occurrence of a mis-operation caused by an operator.

In the plant operation apparatus as another preferred embodiment of the present invention, the selection device comprises a module switch having a plurality of channels, and the module switch is formed so that only one channel corresponding to one train is selected. It is thereby possible to prevent an occurrence of a mis-operation caused by an operator.

In the plant operation apparatus as another preferred embodiment of the present invention, the selection device comprises a mechanical gear type switch, and the mechanical gear type switch is formed so that only one channel corresponding to one train is selected. It is thereby possible to prevent an occurrence of a mis-operation caused by an operator.

In the plant operation apparatus as another preferred embodiment of the present invention, the mechanical gear type switch incorporated in the selection device keeps a neutral position while no train is selected. It is thereby possible to prevent an occurrence of a mis-operation caused by an operator.

In the plant operation apparatus as another preferred embodiment of the present invention, the plant operation apparatus further comprises a large type display device for displaying operation information such as train selection states and the like to a plurality of operators simultaneously and a computer for controlling a display of the operation information on the large type display device, wherein the plurality of operators in charge of the train selection operation see the train selection information simultaneously displayed on the large type display device, in order to prevent occurrence of a mis-operation caused by the plurality of operators. It is thereby possible to prevent an occurrence of a mis-operation caused by an operator.

In the plant operation apparatus as another preferred embodiment of the present invention, the plant operation apparatus further comprises train pilot lamps for indicating the train selection state based on the train selection information output from the operation display screen control device, and control train pilot lamps for indicating the train selection state based on the train selection information output from the selection device, wherein it is possible to prevent occurrences of a mis-operation by selecting a target train to be selected while the operator sees the train selection state in which the selection train pilot lamp corresponding to the selected train lights. It is thereby possible to prevent occurrences of mis-operations caused by operators.

In the plant operation apparatus as another preferred embodiment of the present invention, the operation display screen device controls a display of a flow diagram of a plant system displayed on the operation panel so that a selection state of a target plant device to be operated in the selected train is displayed near the target plant device on the flow diagram in order to prevent an occurrence of a mis-operation caused by an operator.

In the plant operation apparatus as another preferred embodiment of the present invention, the selection device comprises a logical circuit for preventing to generate and to output the selection signal even if a mis-operation, caused when the momentary type push buttons corresponding to the trains that are not selected by the operator are pushed, is happened. It is thereby possible to prevent an occurrence of a mis-operation caused by an operator.

In the plant operation apparatus as another preferred embodiment of the present invention, the operation display screen control device has a train identification table used for obtaining information of the train to be selected based on information such as a target device to be operated and operation contents included in the operation signal transferred from the operation panel, and the operation display screen control device selects the train based on the information in the train identification table. It is thereby possible to increase reliability of the train selection operation.

In the plant operation apparatus as another preferred embodiment of the present invention, the train control device has a train identification table used for obtaining information of the train to be selected based on information such as a target device to be operated and operation contents included in the control signal transferred from the operation display screen control device, and the train control device selects the train based on the information in the train identification table. It is thereby possible to increase reliability of the train selection operation.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the plant operation apparatus according to the present invention will now be described with reference to the drawings.

Basic Configuration

Figure 4:
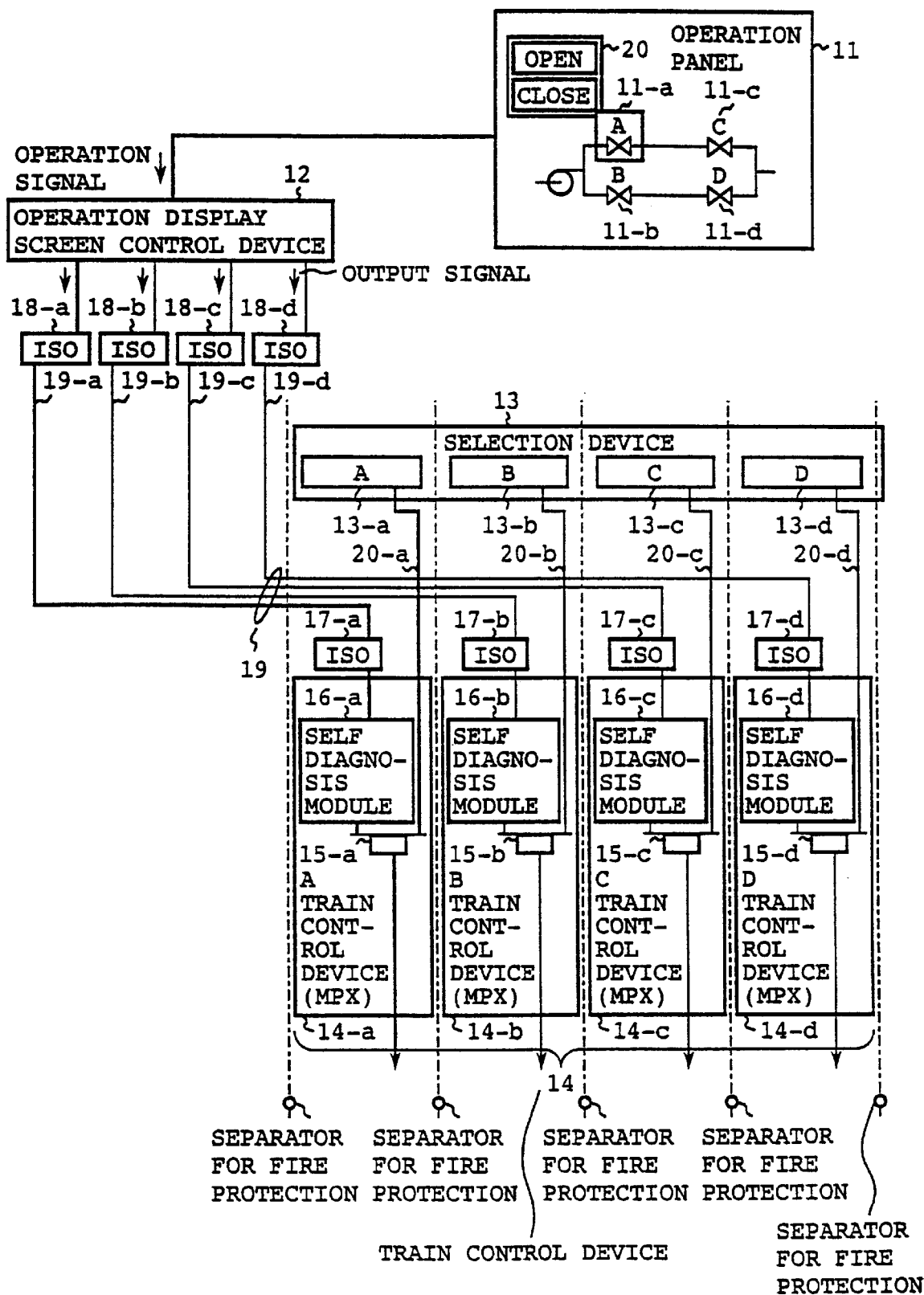
FIG. 4 is a block diagram showing a basic configuration of a plant operation apparatus according to the present invention.

FIG. 4 is a block diagram showing a basic configuration of a plant operation apparatus according to the present invention, in which one flat display panel (hereinafter referred to as FDP) is incorporated. Although FIG. 4 shows one FDP, it is possible to incorporate a plurality of FDPs. In FIG. 4, the reference number 11 designates a touch operation panel for touch operation including an FDP. It is also possible to place a plurality of FDPs in the touch operation panel. The reference number 12 denotes an operation display control device for generating control signals, based on the operation signals that have been generated by instructions from the operation panel 11 and have been transferred, by which the operation of each train is controlled and for transferring the control signals to a corresponding train. The reference number 13 indicates a selection device comprising a plurality of selection units 13-a, 13-b, 13-c, and 13-d. Two or more selection units 13-a to 13-d are not ON simultaneously. The reference number 14 designates a control device for controlling the operation of the trains. The control device 14 comprises four control units each unit controlling the operation of each of the train A, the train B, the train C, and the train D. Each train is physically separated from the adjacent train by using a fire protecting separator designated by the alternate long and short dash lines. The reference numbers 16-a, 16-b, 16-c, and 16-d designate self-diagnosis modules. The reference numbers 17-a, 17-b, 17-c, 17-d, 18-a, 18-b, 18-c, and 18-d designate isolators as separation devices (hereinafter referred to as ISO). Among the ISOs 17-a, 17-b, 17-c and 17-d and the ISOs 18-a, 18-b, 18-c and 18-d are connected through a wire group 19, namely the wire 19-a, the wire 19-b, the wire 19-c, and the wire 19-d. The wires 19-a, 19-b, 19-c, and 19-d are formed by pre-fabricated cables or optical fiber cables, each covered with a fire protection metal-shield, and isolated electrically to each other.

Figure 5:
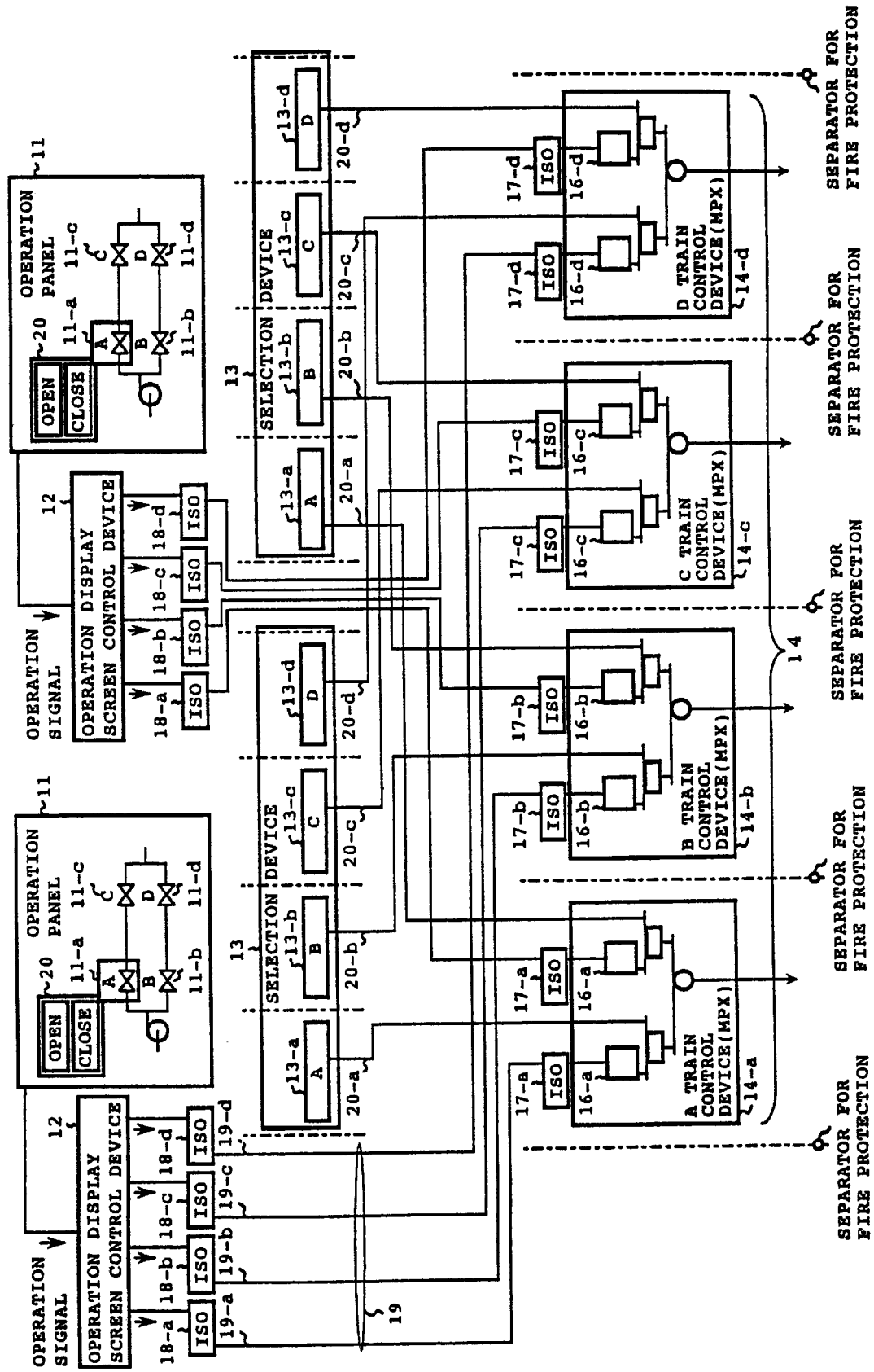
FIG. 5 is a block diagram showing another configuration of the plant operation apparatus according to the present invention.

FIG. 5 is a block diagram showing another configuration of the plant operation apparatus according to the present invention. In the plant operation apparatus shown in FIG. 5, two FDPs and two selection devices 13 are incorporated. In FIG. 5, the reference number 11 designate touch operation panels and each touch operation panel 11 comprises the FDP. It is also possible to place a plurality of operation panels in each touch operation panel 11. The reference number 12 denotes an operation display control device for generating control signals to control the operation of each train based on the operation signal generated by and transferred from the operation panel 11, and for transferring the control signals to corresponding train. The reference number 13 denotes two selection devices, as shown in FIG. 5. Each selection device 13 comprises a plurality of selection units 13-a, 13-b, 13-c, and 13-d. Two units or more in the selection units 13-a, 13-b, 13-c, and 13-d are not ON simultaneously. The reference number 14 designates a control device for controlling the operation of the trains. The control device 14 comprises four control units each unit controlling the operation of each of the train A, the train B, the train C, and the train D. Each train is physically separated from the adjacent train by using a fire protecting separator designated by the alternate long and short dash lines. The reference numbers 17-a, 17-b, 17-c, 17-d, 18-a, 18-b, 18-c, and 18-d designate isolators as separation devices (hereinafter referred to as ISO). Among the ISOs 17-a, 17-b, 17-c and 17-d and the ISOs 18-a, 18-b, 18-c and 18-d are connected through a wire group 19 comprising the wire 19-a, the wire 19-b, the wire 19-c, and the wire 19-d. Like the configuration of the operation apparatus shown in FIG. 4, the wires 19-a, 19-b, 19-c, and 19-d are formed by pre-fabricated cables or optical fiber cables, each is covered with a fire protection metal shield, and isolated electrically from each other.

In the basic configuration of each of the plant operation apparatus shown in FIG. 4 and FIG. 5, the central control panel including the operation panel 11 has the fire protection separations comprising metal plates and so on. Push buttons incorporated in the central control panel are separated physically and isolated electrically from each other because equipment such as the push buttons are independent to each other. In addition to this, the wires between the devices are covered with fire protection metal armor. Furthermore, the devices are separated physically and isolated electrically with the ISOs and the optical fiber cables, and the like. In the sections located in the downstream viewed from the train control device 14 (or from the train multiplexer (MPX)), control panels are physically separated and electrically isolated from each other for fire protection.

Next, a description will be given of the operation of the plant operation apparatus of the present invention.

In order to maintain the supervision operation function of the safety protection system when the FDP breaks down, although the plant operation apparatus shown in FIG. 5 is required basically, the basic operation of the plant operation apparatus having the configuration shown in FIG. 4 will be explained for brevity.

Valves 11-a, 11-b, 11-c, and 11-d for the trains A, B, C, and D are shown in the operation panel 11 of the touch operation shown in FIG. 4. When an operator touches symbol switches for the valves 11-a, 11-b, 11-c, and 11-d on the operation panel 11, the operation unit (including open/close switches) 20 corresponding to the valves 11-a, 11-b, 11-c, and 11-d is then displayed on the operation panel 11 for the operator. The operator touches the open switch or the close switch for the valves in order to indicate the operation to be executed. Because it must be required to separate the valves and the control device for controlling those valves by using the train separation, the train control device 14 is divided into the control devices 14-a, 14-b, 14-c, and 14-d for the train A, the train B, the train C, and the train D. The selection signals as control signals generated by and transferred from the single operation display control device 12 is transferred to each train. In the configuration described above in which the operation display control device 12 is simply connected to each of the train control devices 14-a, 14-b, 14-c, and 14-d, there is a possibility that two or more train control devices 14-a, 14-b, 14-c, and 14-d operate simultaneously and an error occurs. This configuration can not obtain that the plant operation apparatus satisfies the separation criteria adequately. That is, there is the possibility that two or more train control devices 14-a, 14-b, 14-c, and 14-d will malfunction due to an error of the operation display control device 12. This does not satisfy the separation requirement.

In order to satisfy the separation requirement described above, the plant operation apparatus according to the present invention has the basic configuration in which a train control means including software (hereinafter referred to as a S/W train selection means) and a train selection means including hardware (hereinafter referred to as a H/W train selection means) are combined incorporated in each of the operation display screen control device 12 and the train control devices 14-a, 14-b, 14-c, and 14-d forming the train control device 14. Thereby, only the selected train can be controlled correctly and safely without causing any errors. Thus, the plant operation apparatus satisfies the separation requirement adequately without causing any operation errors, utilizing the selection means having diversity based on the S/W train selection switch and the H/W train selection switch. When an operator operates the operation panel 11, the operation panel 11 generates the operation signal and then transfer the generated operation signal to the operation display screen control device 12. The operation display screen control device 12 generates output signals as plant operation instructions to control the operation of the plant based on the received operation signal. At this time, the operation display screen device 12 judges and then selects the target train based on identification symbols corresponding to the selected devices and the train. The operation display screen control device 12 outputs the control signals as output signals to the target train through the A train control device 14-a in the train control device 14, for example. The train control device 14 receives the control signals and controls the operation of the plant including the target train based on the received control signals. When the control signals includes only unique identification symbols in the plant such as valve numbers and the like, it is possible to judge the target train based on the identification number. By this operation, it is basically possible to perform the plant control including only the target train. It is possible to place the operation panel 11, the operation display screen control device 12, and the equipment, placed between the operation display screen control device 12 and the train control device 14, in duplicate or more in order to maintain the function of the plant operation and to keep the safety operation for the plant.

Hereinafter, a description will now be given of a case where there is only one set of the operation panel 11, the operation display screen control device 12, and wires among ISOs 18-a, 18-b, 18-c, 18-d, and ISOs 17-a, 17-b, 17-c, 17-d, for brevity.

When a failure caused by a mis-operation in the operation display screen control device 12 occurs (namely, when a single failure occurs), there is a possibility that the operation display screen control device 12 generates and outputs the control signal including a failure device identification signal and a wrong train selection signal. For example, when an operator wants to operate the valve 11a belonging to the A train through the operation panel 11, there is a case that the operation display screen control device 12 outputs a wrong instruction or a mis-instruction such as "the valve 11a, A train, open" and "the valve 11-b, B train, open" instead of a correct instruction such as "valve 11a, A train, open". In this case, the single failure caused by the operation display screen control device 12 is influences to a plurality of other trains. It is thereby difficult to maintain the train independence. In order to overcome this, the plant operation device of the present invention has the train selection system in which the S/W train selection control function obtained by using the operation display screen control device and the train control device and the H/W train selection function obtained by using the H/W selection device 13 are combined. A target train to be operated is designated by selecting one of the selection switches 13-a, 13-b, 13-c, and 13-d in the selection device 13. That is, the control signal based on the operation signal transferred from the operation panel 11 is output to the control device for the plant only by establishing the AND logic of the AND circuits 15-a, 15-b, 15-c, and 15-d in each of the train control device 14-a, 14-b, 14-c and 14-d. Each of the train control devices 14-a, 14-b, 14-c, and 14-d for each train outputs the operation control signal to the plant in order to control and operate the plant only by establishing the result of the AND logic operation between an agreement signal and the hardware signals 20-a, 20-b, 20-c, and 20-d transferred from the selection device 13. The AND logic is executed by the AND circuits 15-a, 15-b, 15-c, and 15-d. The agreement signal is generated only that the control signals, generated based on the operation signal, with the train information added by the operation display screen control device 12 agrees with the train information belonging to each train control device. Thereby, the plant operation device of the present invention is capable of having the function of train independence and the safety for a single failure.

On the other hand, it is difficult to achieve this train independence and the safety protection only by using the S/W train selection function executed by the operation display screen control device 12 and the train control device 14.

Furthermore, it is requested to satisfy the separation criteria for the single failure of the H/W switch in the selection device 13, or for the single failure caused in operations by the operators. Therefore, the selection device 13 must have the function for automatically cutting the connections to other trains selected by a mis-operation or an error selection when one train is selected and the function to connect only the selected train. This function must keep the train separation even if a switch failure or a mis-operation occurs.

Based on the basic configuration of the plant operation apparatus having the functions described above, various embodiments according to the plant operation apparatus will be explained. In the following description about the preferred embodiments according to the present invention, the plant operation apparatus having the combination function of the S/W train selection function realized by the operation display screen control device and the train control device and the H/W train selection function realized by the selection device that is capable of exclusively selecting only one train will be explained. That is, in the following first embodiment to the eighth embodiment, the diversified train separation means based on the H/W train selection function will be mainly explained. In the following ninth embodiment to the thirteenth embodiment, the train selection means based on the S/W train selection function will be mainly explained.

First Embodiment

Figure 6:
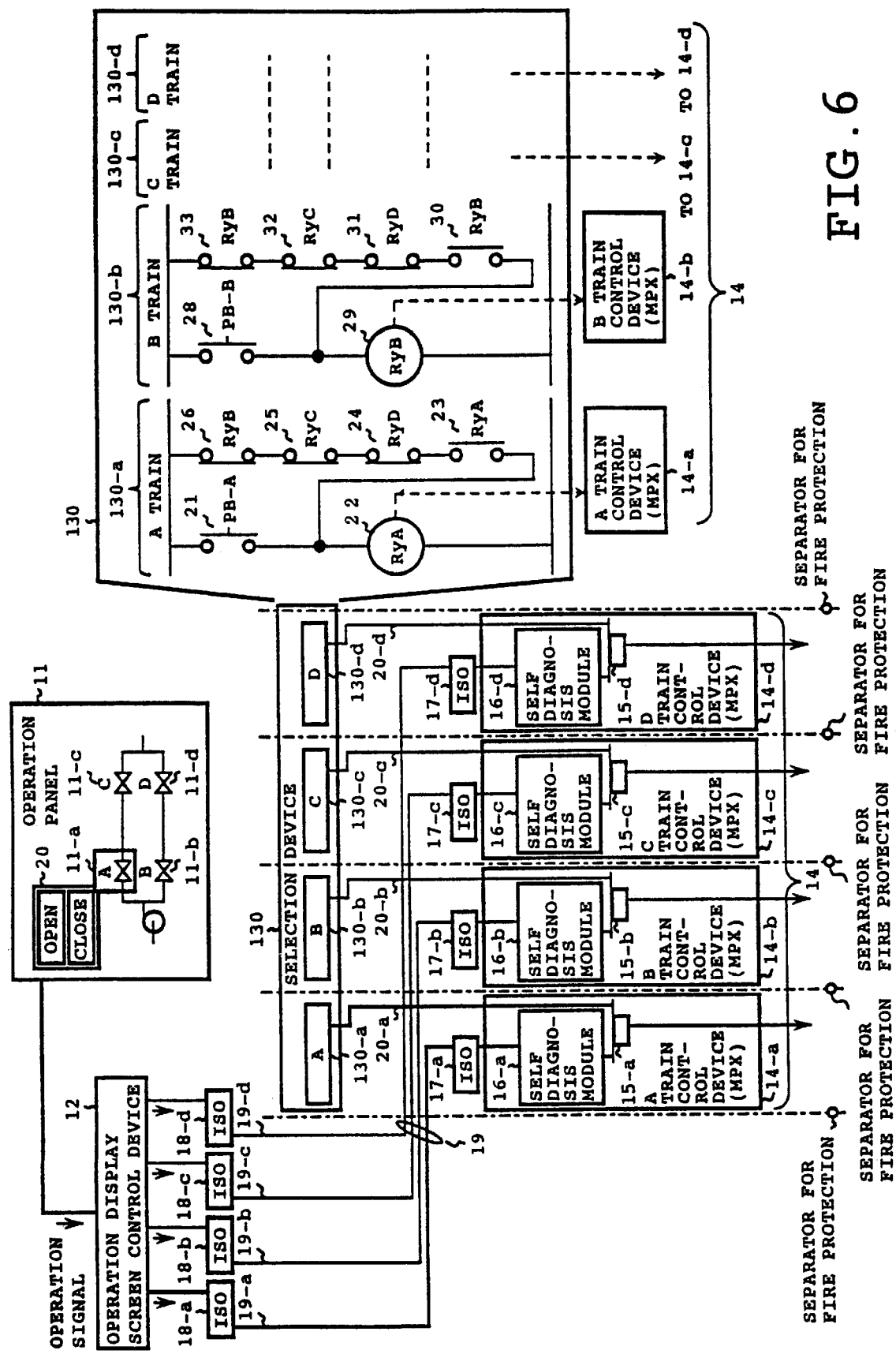
FIG. 6 is a block diagram showing a plant operation apparatus of the first embodiment according to the present invention.

FIG. 6 is a block diagram showing the plant operation apparatus of the first embodiment according to the present invention. In FIG. 6, the reference number 11 designates an operation panel used for the touch operation by operators including the Flat Display Panel (FDP). It is possible to have a plurality of FDPs in the operation panel 11. The reference number 12 denotes operation display screen control device for generating a control signal to be used for controlling each train based on the operation signal generated by the operation of an operator in the operation panel 11 and then transferred to the operation display screen control device 12. The operation display screen control device 12 transfers the generated control signal to the corresponding train control device 14. The reference number 130 designates a selection device comprising a plurality of selection units 130-a, 130-b, 130-c, and 130-d. The selection device 130 having a hardware (H/W) selection logic for exclusively selecting a single train is formed so that two or more contacts are not ON simultaneously. For example, the selection units 130-a, 130-b, 130-c, and 130-d, corresponding to each train, including the push buttons forming the selection device 130 comprises train selection switches (PB-A, PB-B, . . . ) 21, 28, . . . and contacts 23 to 26 and 30 to 33. The reference number 14 denotes the train control device for controlling the operation of the trains A, B, C, and D comprising the A train control device 14-a, the B train control device 14-b, the C train control device 14-c, the D train control device 14-d. The reference numbers 16-a, 16-b, 16-c, and 16-d denote self diagnosis devices. The reference numbers 15-a, 15-b, 15-c, and 15-d indicate AND circuits for performing AND operations between the control signals transferred from the self diagnosis devices 16-a, 16-b, 16-c, and 16-d and the control signals transferred from the selection units 130-a, 130-b, 130-c, and 130-d in the selection device 130 and for outputting the control signal as the result of the AND operation.

The adjacent trains that are adjacent to each other are separated physically by using the fire protection separator designated by using the alternate long and short dash lines. The reference characters 17-a, 17-b, 17-c, and 17-d, and 18-a, 18-b, 18-c, and 18-d designate isolators as separation devices, isolators 17-a, 17-b, 17-c, and 17-d are connected to the isolators 18-a, 18-b, 18-c, and 18-d through wires 19-a, 19-b, 19-c, and 19-d, respectively. The wires 19-a, 19-b, 19-c, and 19-d are coated with prefabricated cables or with optical fibers whose surfaces are coated with a fire protection metal armor to isolate them to each other electrically.

Figures 1A, 1B:
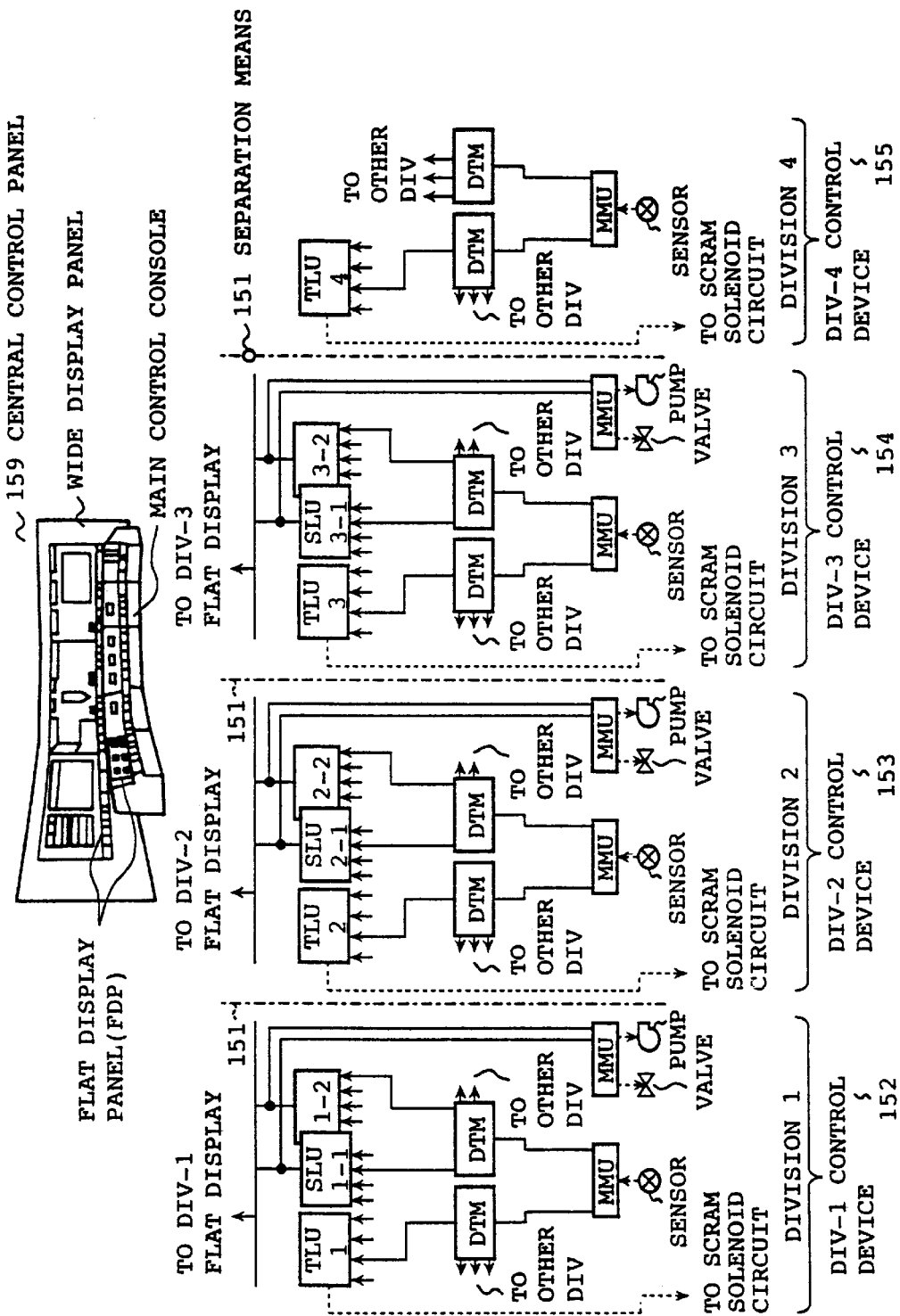
FIGS. 1(a) and 1(b) are a pictorial view and a diagram showing a configuration of a conventional system as a safety protection system including touch operated equipment.
Figure 2:
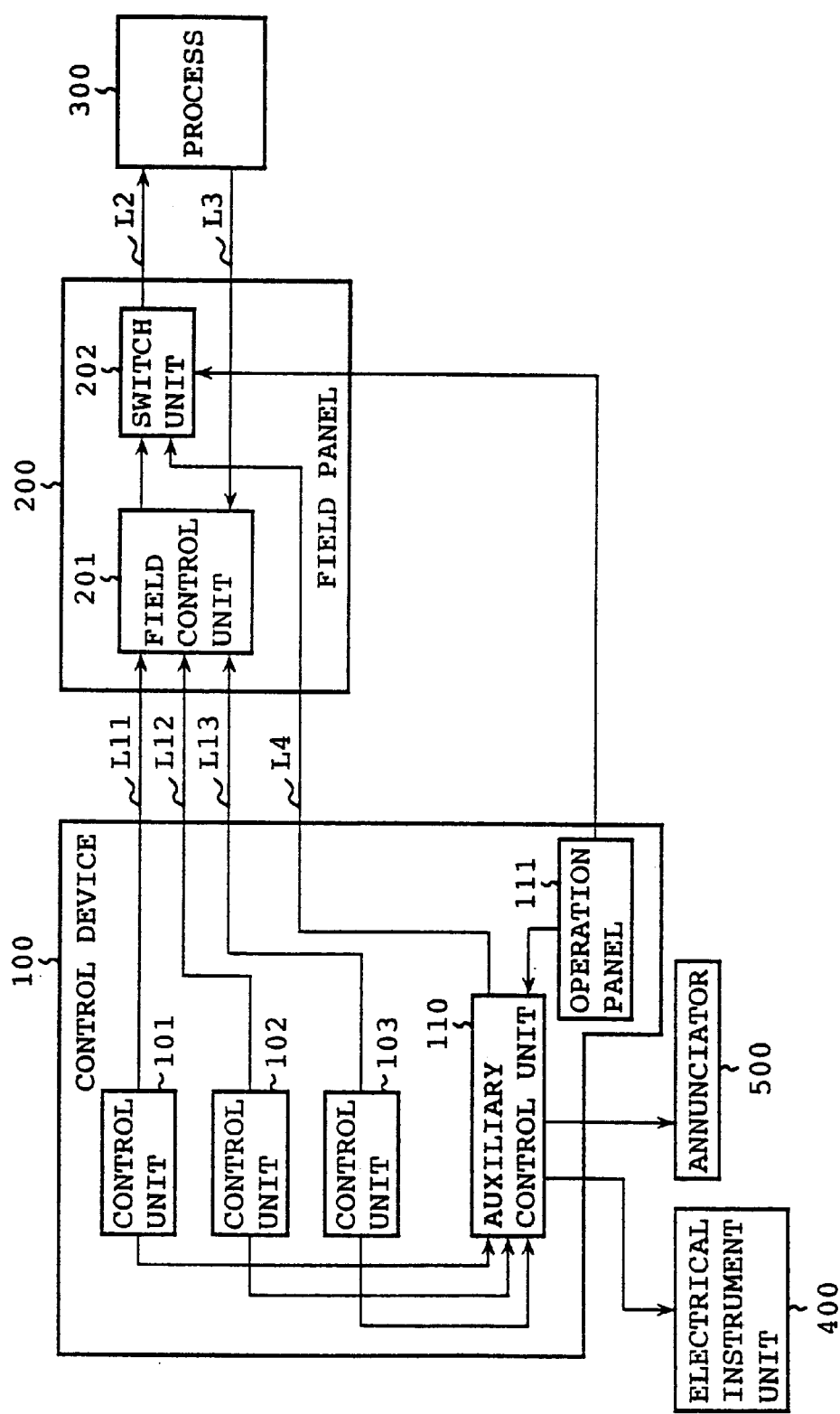
FIG. 2 is a block diagram showing a conventional process control apparatus.
Figure 3:
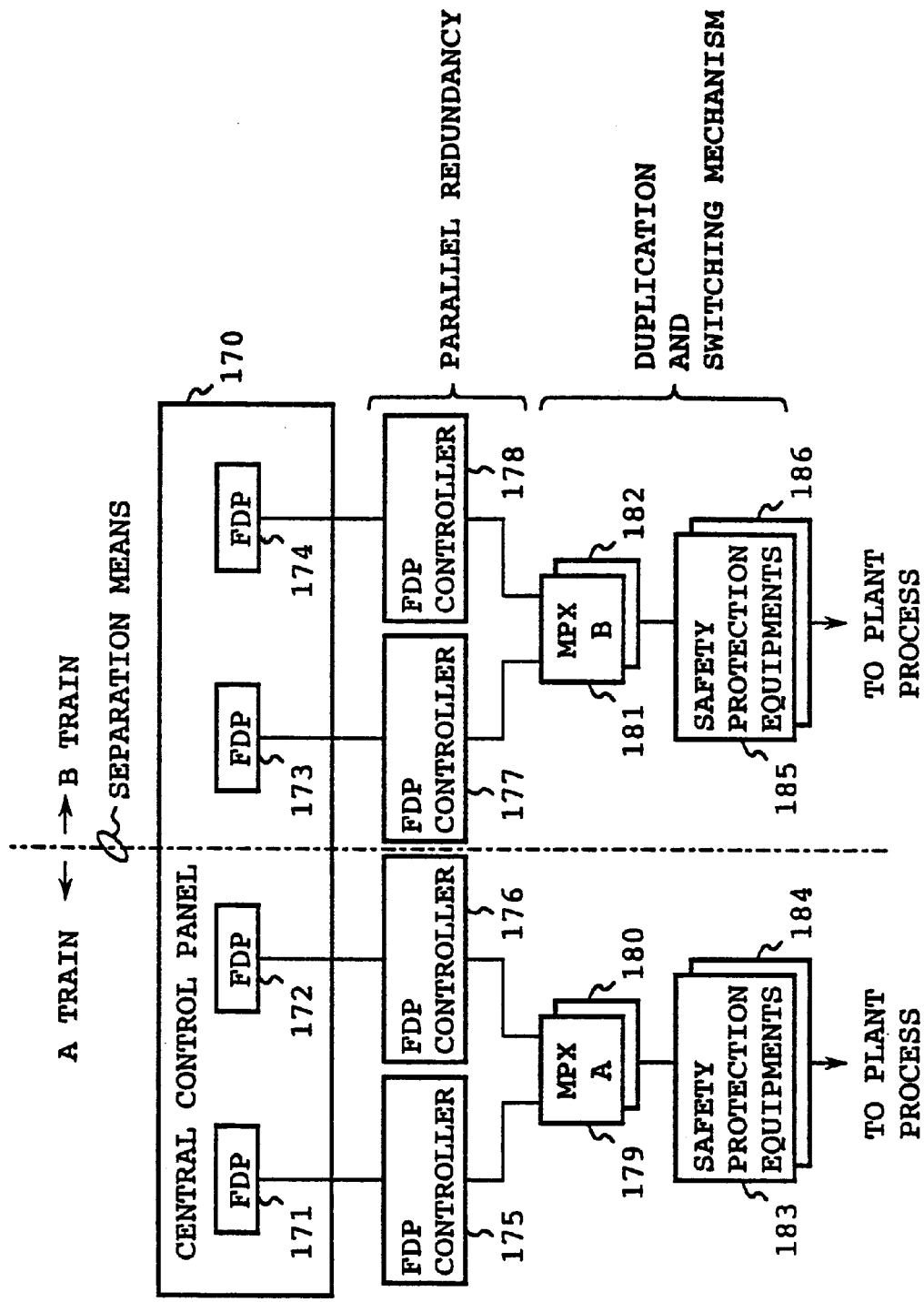
FIG. 3 is a diagram showing a conceptual configuration of a train separation based on a conventional multiplicity design method.

Like the operation apparatus having the basic configuration according to the present invention shown in FIGS. 2 and 4, in the central control panel including the operation panel 11 in the plant operation apparatus as the first embodiment according to the present invention shown in FIG. 6, the fire prevention separation with metal plates has been applied and equipments such as each button and the like are separated physically and isolated electrically because they are independent from each other.

In addition to this, the wires between these equipment are coated with a fire protection metal shield or by using the metal covered cables. In addition to this, the wires are separated physically with the isolators and isolated electrically by using the optical fiber cables. The fire protection, the physical separation, and the electrical isolation are performed for downstream sections viewed from the train control device 14 (or the train MPX) by dividing the control plate into different control plates.

Thus, in the plant operation device according to the first embodiment, the S/W train selection is performed by the operation panel 11 and the operation display screen control device 12 and the train control device 14 and the train selection is further performed by the selection device 130. This combination achieves the train separation and satisfies the single failure criteria.

Next, a description will now be given of the operation of the plant operation apparatus of the first embodiment.

In the plant operation apparatus of the first embodiment shown in FIG. 6, the operation display screen control device 12 distinguishes which train will be selected and operated based on the operation signal generated by touching the operation panel 11 by the operator and transferred from the operation panel, and then the operation display screen control device 12 outputs the control signal only to the corresponding train control device. In this case, the control signal to be transferred to the corresponding train control device is distinguished exclusively by using the S/W selection function.

Next, the operation of the H/W train selection operation is further executed by the selection device 130.

In the selection device 130, the selection unit 130-a, 130-b, 130-c, 130-d are incorporated corresponding to the A train, the B train, the C train, and the D train, respectively. In order to prevent a spreading fire, the fire protection separators are placed between the selection devices 130-a, 130-b, 130-c, and 130-d.

In the plant operation device shown in FIG. 6, when the operator pushes the selection switch (PB-A) 21 for the train A, a relay (RyA) 22 is electrically excited and the contact for the train A is closed (namely, becomes ON), and other contacts for the B train, the C train, and the D train are opened automatically (namely become OFF). Thereby, the A train control operation only for the train control device (or the multiplexer MPX) selected by the selection device 130 will be performed.

Similarly, when the operator pushes the selection switch (PB-B) 28 for the train B, a relay (RyB) 29 is electrically excited and the contact for the train B is closed (namely, becomes ON), and other contacts for the A train, the C train, and the D train are open automatically (namely become OFF). Thereby, the B train control operation only for the train control device (or the multiplexer MPX) selected by the selection device 130 will be performed.

As described above, according to the plant operation device of the first embodiment, it is possible to satisfy the single failure criteria in a diversified train selection process obtained by the combination of the S/W train selection function executed by the operation display screen control device 12 and the train control device 14 and the H/W train selection function executed by the selection device 130.

Second Embodiment

Figure 7:
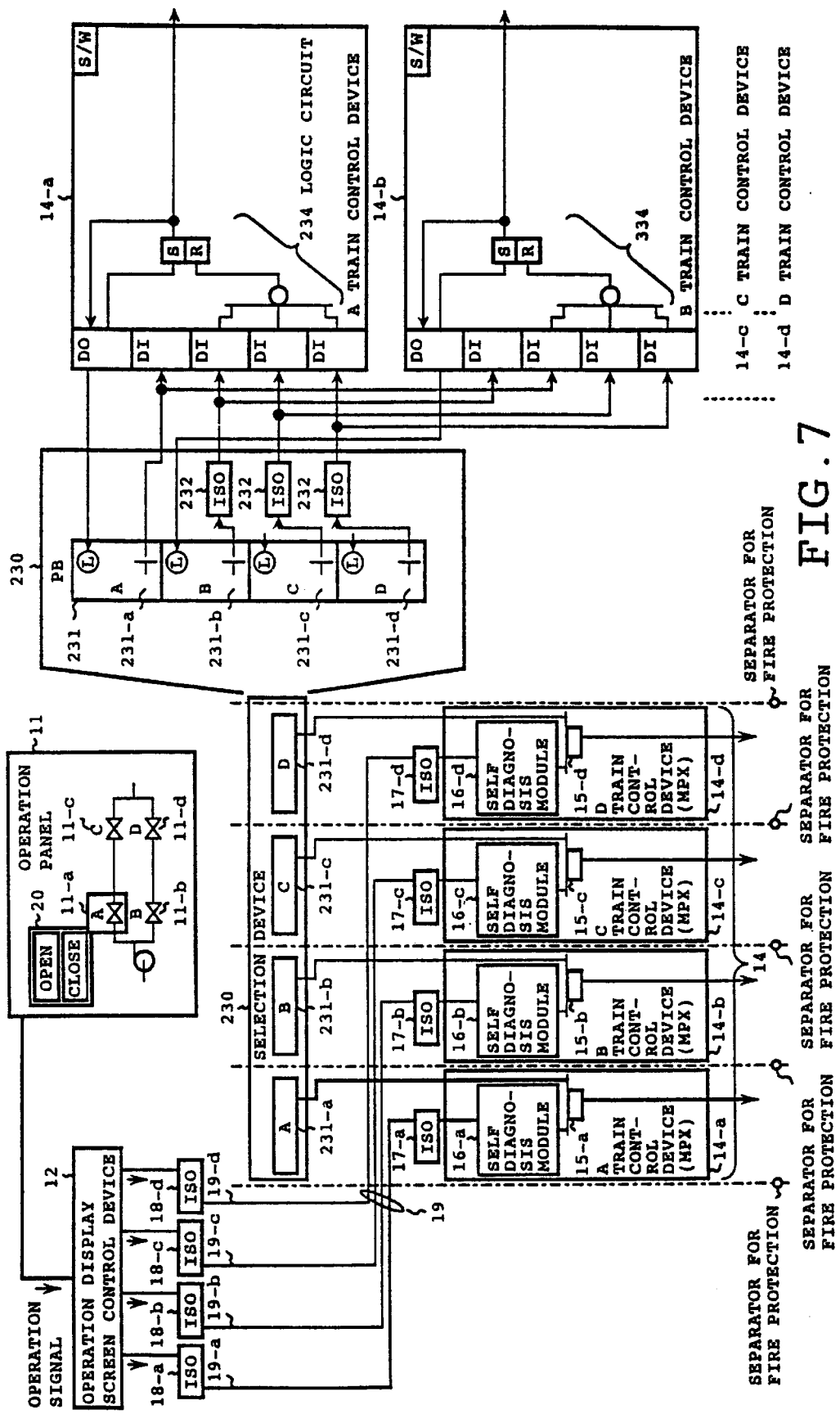
FIG. 7 is a block diagram showing a plant operation apparatus of the second embodiment according to the present invention.

FIG. 7 is a block diagram showing the plant operation apparatus of the second embodiment according to the present invention. In FIG. 7, the reference number 230 designates a selection device as a H/W train selection device comprising a plurality of selection switches of a push button type 231-a, 231-b, 231-c, and 231-d. This selection device 230 has the configuration of a selection logic for exclusively selecting a single train so that two or more contacts of the switches are not ON simultaneously. The selection device 230 comprises train selection devices 231-a, 231-b, 231-c, 231-d, and isolators (ISOs) 232. As shown in FIG. 7, each of the train control devices 14-a, 14-b, 14-c, and 14-d has a logic circuit 234. FIG. 7 shows mainly the detailed configuration of each of the logic circuits in the train control devices 14-a and 14-b. The other train control devices 14-c and 14-d have the same configuration. The isolator 232 isolates electrically from other devices. Other components in the plant operation apparatus of the second embodiment are the same as those of the plant operation apparatus of the first embodiment, therefore the explanation of them is omitted for brevity. The same numbers will be used for those same components.

The plant operation apparatus of the second embodiment satisfies the single failure criteria by using a diversified train separation like the plant operation apparatus of the first embodiment. In order to achieve this, the plant operation apparatus of the second embodiment uses a logical circuit 234 (as a S/W function) comprising a microprocessor and momentary switches in the selection device 230 (the H/W train selection function) in addition to the train separation means of a S/W train selection function obtained by the operation display screen control device 12 and the train control device 14.

Next, a description will be given of the operation of the plant operation apparatus as the second embodiment.

In FIG. 7, when an operator pushes the selection switch 231-a in the selection device 230 for the A train, the selection signal to select the A train is generated. This selection signal is transferred to the train control device 14 (or the multiplexer MPX). like the selection switch 231-a, when the operator pushes one of other selection switches 230-b, 230-c, 230-d in the selection device 230 for the B train, the C train, and the D train, selection signals corresponding to the B train, the C train, and the D train are generated. One of these selection signals is electrically isolated and physically separated from each other and from other devices and transferred to the train control device 14 through the isolators 232. According to the selection signal from the selection device 230, the logical circuit 234 in the train control signal 14 resets the A train selection that has been selected by the preceding operation.

Thus, when an operator selects one train, other trains including the previously selected train are reset automatically. The operation when the operator selects other train are same. Therefore the plant operation apparatus can perform correctly the selection control operation only for selected train. In order to keep the fire protection, the separation for each train is performed by using fire protection separators and cables with a fire protection metal shield.

As described above, according to the plant operation apparatus of the second embodiment, it is possible to satisfy the single failure criteria by using a diversified train separation, like the plant operation apparatus of the first embodiment. In order to achieve this, the plant operation apparatus of the second embodiment uses the logical circuit 234 comprising the microprocessor (as the S/W function) and the momentary switches as the H/W train selection function incorporated in the selection device 230 in addition to the train separation means of the S/W train selection function obtained by the operation display screen control device 12 and the train control device 14.

Third Embodiment

Figure 8:
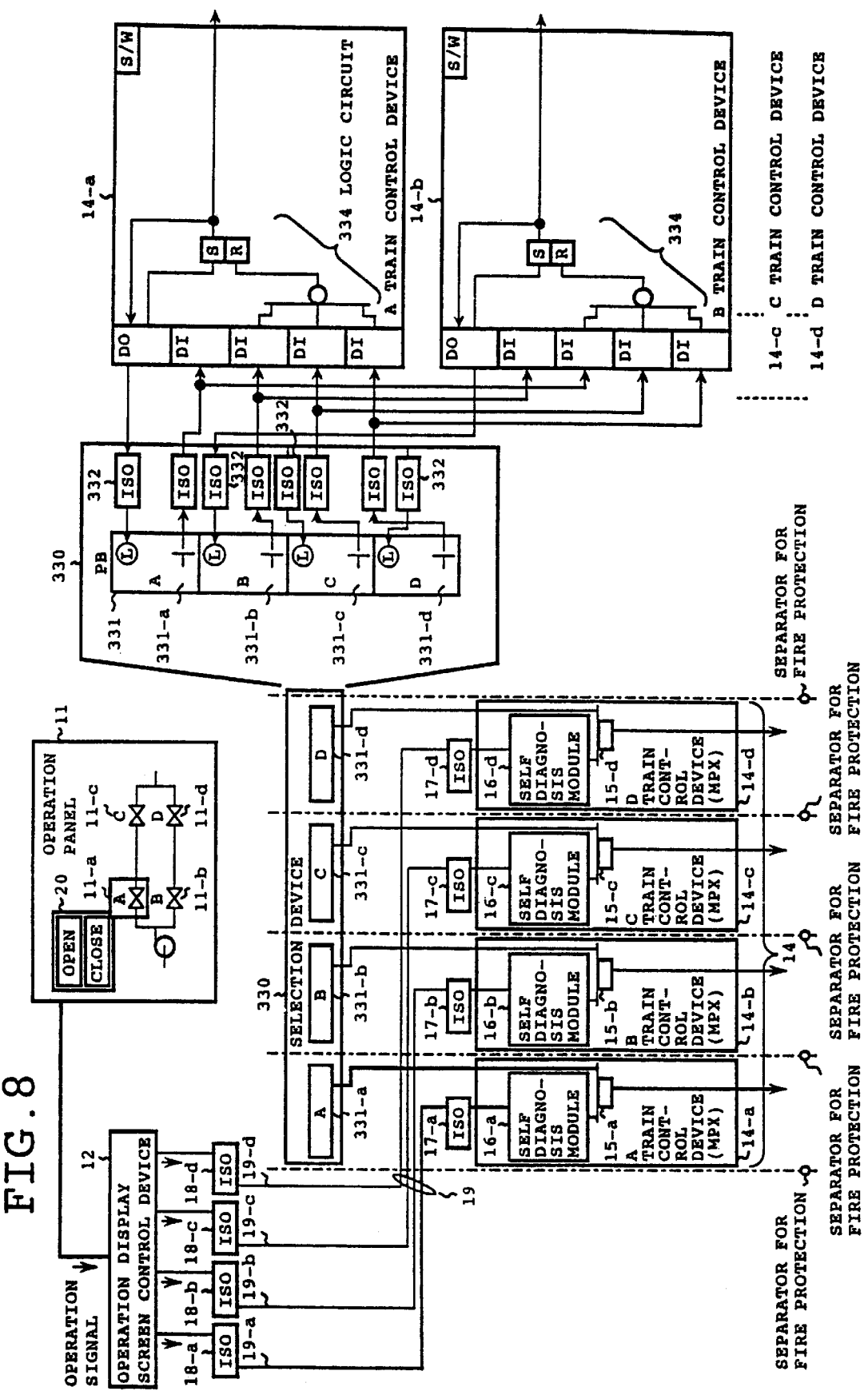
FIG. 8 is a block diagram showing a plant operation apparatus of the third embodiment according to the present invention.

FIG. 8 is a block diagram showing the plant operation apparatus of the third embodiment according to the present invention. In FIG. 8, the reference number 330 designates a selection device formed by hardware devices. The selection device 330 comprises an exclusive selection logic for selecting exclusively one train so that two or more contacts are not ON. For example, the selection device 330 comprises the train selection switches 330-a, 330-b, 330-c, and 330-d, and the isolators (ISOs) 332. Each of the train control devices (or multiplexers (MPX)) 14-a, 14-b, 14-c, and 14-d includes the logical circuit 334. Although FIG. 8 shows mainly the train control devices 14-a and 14-b for the A train and the B train, the other train control devices 14-c, and 14-d have the same configuration. The isolator 232 isolates electrically from other devices. Other components in the plant operation apparatus of the third embodiment are the same as those of the plant operation apparatus of the first embodiment, therefore the explanation of them is omitted for brevity. The same numbers will be used for those same components.

As described above, because each train selection button belongs to each train in the plant operation apparatus of the second embodiment shown in FIG. 7, it must be required to isolate electrically and separated physically the wires connected to each of the selection devices 231-a, 231-b, 231-c, and 231-d. This causes to increase the wiring area in the plant operation apparatus and wire design time. In order to avoid this, the plant operation apparatus of the third embodiment has the configuration in which isolators (ISOs) 332 as separation devices are formed at the output terminals and the input terminals of the selection device 330 so that each selection system in the selection device 330 belongs to no train. In the illustrated configuration the degree of separation between the FDPs can be increased by separating the power source supplied to each FDP.

As described above, according to the plant operation apparatus of the third embodiment, the isolators (ISOs) as the isolation devices are incorporated in the input and output terminals in the selection switches for exclusively selecting one train in the selection device 330 corresponding to each of the trains. It is thereby possible to achieve the configuration that the selection switch system belongs to no train, so that the wire separation can be easily performed in addition to the separation means of the S/W train selection function to separate the trains obtained by the operation display screen control device 12 and the train control device 14. It is therefore possible to obtain the train selection system to satisfy the single failure criteria by using the diversified train separation function.

Fourth Embodiment

Figure 9:
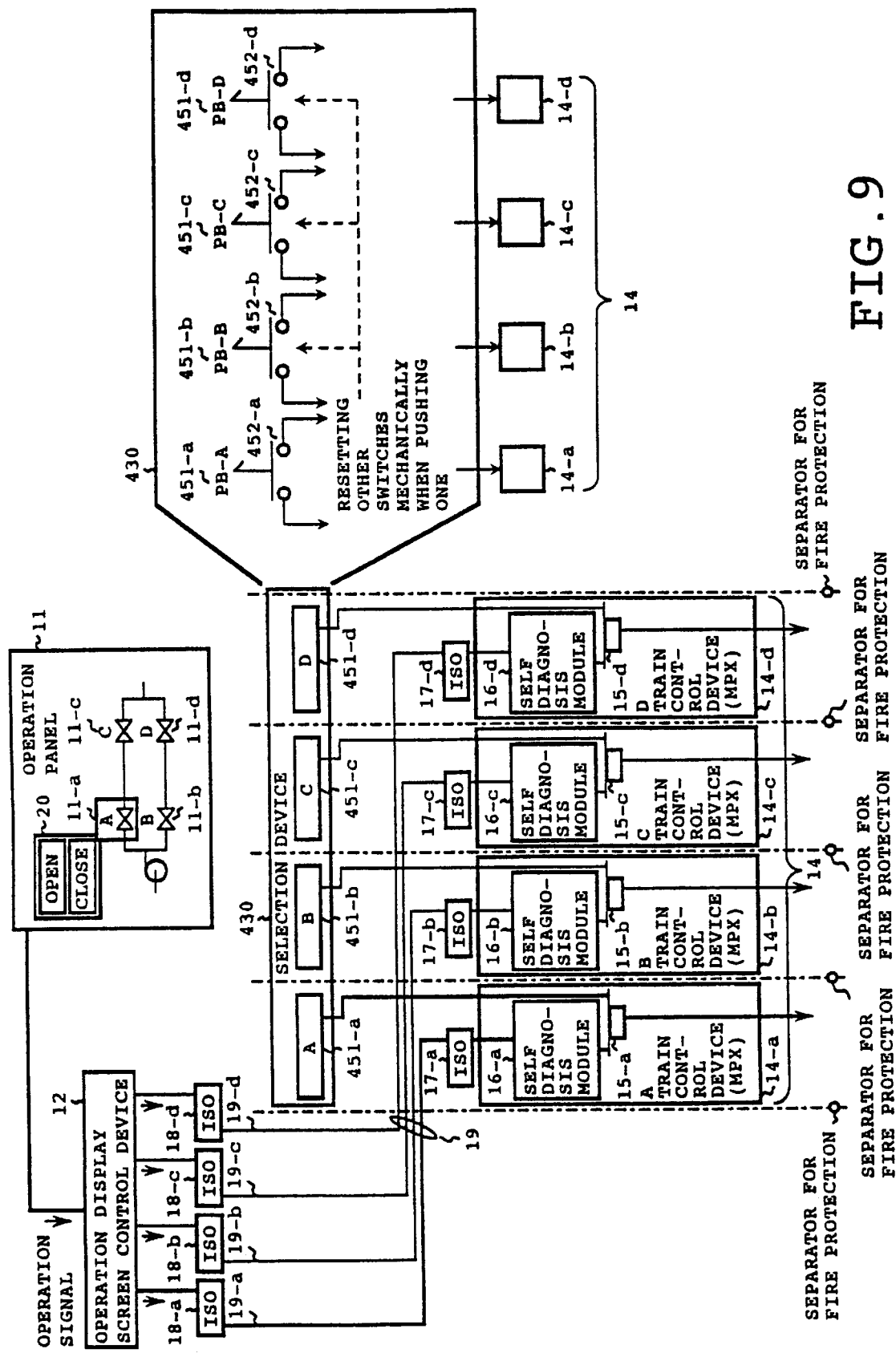
FIG. 9 is a block diagram showing a plant operation apparatus of the fourth embodiment according to the present invention.

FIG. 9 is a block diagram showing the plant operation apparatus of the fourth embodiment according to the present invention. In FIG. 9, the reference number 430 designates a selection device for selecting the train comprising the train selection switches 451-a, 451-b, 451-c, and 451-d. Other components in the plant operation apparatus of the fourth embodiment are the same as those of the plant operation apparatus of the first embodiment, therefore the explanation of them is omitted for brevity. The same numbers will be used for those same components.

In the plant operation apparatus of the fourth embodiment, a diversified train separation means is achieved by selecting the train by using the train selection switches 451-a, 451-b, 451-c, and 451-d as the H/W switches in addition to the train separation means obtained by using the S/W train selection comprising the operation display screen device 12 and the train control device 14.

Next, a description will be given of the operation of the plant operation apparatus as the fourth embodiment.

When an operator pushes one of the push button type selection switches 451-a, 451-b, 451-c, and 451-d for selecting one train, other trains that are not selected are reset mechanically and automatically.

For example, when the operator pushes the selection switch 451-a in order to select the A train, other selection switches 451-b, 451-c, and 451-d corresponding to the B train, the C train, and the D train are reset mechanically in which two or more selection switches are not ON (inactive) simultaneously. Then the selection signal for the selected train is transferred from the selection device 430 to the train control device 14.

As described above, according to the plant operation apparatus of the fourth embodiment, only the selection signal for the selected train generated by the push button type selection switch in the selection device 430 is output to the train control device 14. Other selection switched that are not selected are automatically and mechanically reset. It is thereby possible to obtain the train selection system to satisfy the single failure criteria by using the diversified train separation function in addition to the S/W train selection function obtained by the operation display screen control device 12 and the train control device 14.

Fifth Embodiment

Figure 10:
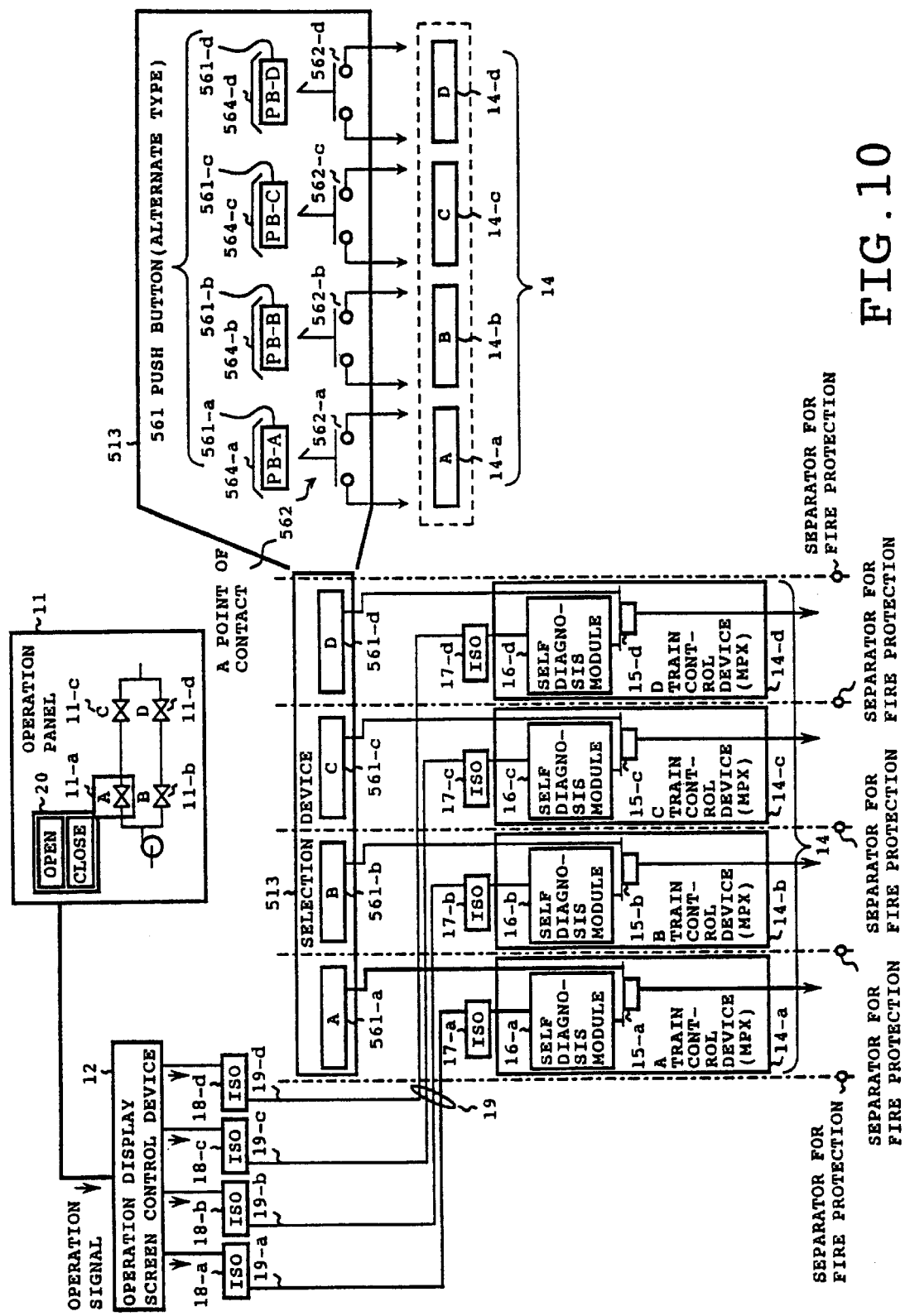
FIG. 10 is a block diagram showing a plant operation apparatus of the fifth embodiment according to the present invention.

FIG. 10 is a block diagram showing the plant operation apparatus of the fifth embodiment according to the present invention. In FIG. 10, the reference number 513 designates a H/W selection device comprising alternate type push buttons 561-a, 561-b, 561-c, and 561-d and contacts 562-a, 562-b, 562-c, and 562-d as train selection switches. The push buttons (PB-A, PB-B, PB-C, PB-D) 561-a, 561-b, 561-c, and 561-d have the error prevention cover 564-a, 564-b, 564-c, and 564-d, respectively. Other components in the plant operation apparatus of the fifth embodiment are the same as those of the plant operation apparatus of the first embodiment, therefore the explanation of them is omitted for brevity. The same numbers will be used for those same components.

The plant operation apparatus of the fifth embodiment has the push buttons 561 for the train selection operation as the H/W selection devices, in addition to the S/W train separation function obtained by the operation display screen control device 12 and the train control device 14. The push buttons 561 have the mis-operation prevention covers 564-a, 564-b, 564-c, and 564-d, and the contacts 562-a, 562-b, 562-c, and 562-d, respectively so that two or more push buttons are not pushed simultaneously. When the operator pushes the push button corresponding to the train to be operated, only the contact of the push button that is pushed by the operator is closed and other contacts become open.

Next, a description will be given of the operation of the plant operation apparatus as the fifth embodiment.

When the push button corresponding to the target train is pushed by the operator, the contact of the selected push button is closed, and other contacts of unselected push buttons become open, so that the selection signal is transferred only from the push button, that is pushed by the operator, to the train control device 14. In this case, pushing two or more push buttons simultaneously by using the mis-operation prevention covers 564-a, 564-b, 564-c, and 564-d. This realizes the exclusive single train selection means.

As described above, because the plant operation apparatus of the fifth embodiment comprises the train selection device having the push buttons with the mis-operation prevention cover, it is possible to obtain the train selection system satisfying the single failure criteria by using the diversified train separation function in addition to the S/W train selection function obtained by the operation display screen control device 12 and the train control device 14.

Sixth Embodiment

Figure 11:
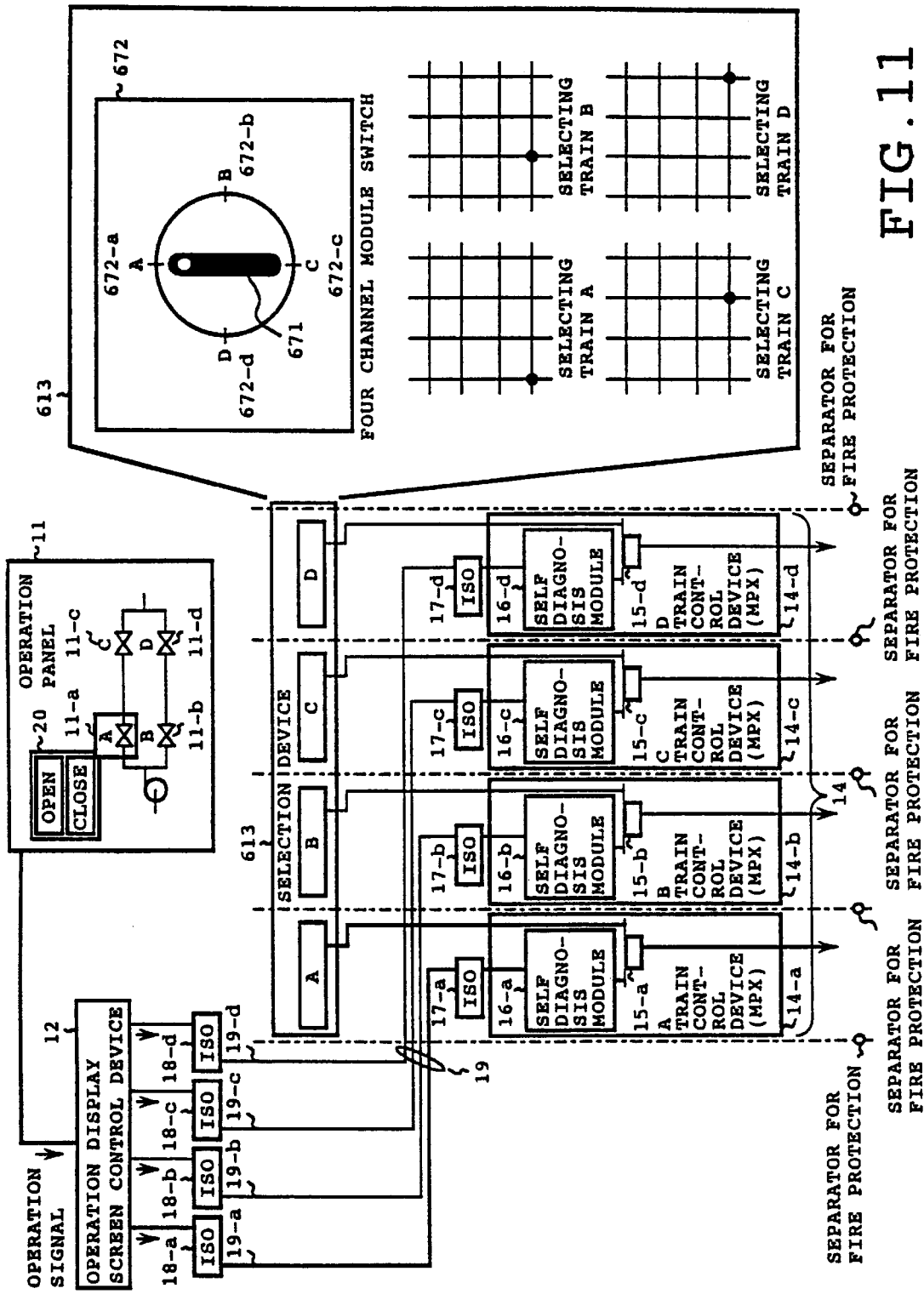
FIG. 11 is a block diagram showing a plant operation apparatus of the sixth embodiment according to the present invention.

FIG. 11 is a block diagram showing the plant operation apparatus of the sixth embodiment according to the present invention. In FIG. 11, the reference number 613 designates a selection device. This selection device 613 has a four channel module switch 672. The reference number 671 denotes a handle of the four channel module switch 672. Other components in the plant operation apparatus of the sixth embodiment are the same as those of the plant operation apparatus of the first embodiment, therefore the explanation of them is omitted for brevity. The same numbers will be used for those same components.

In the plant operation apparatus of the sixth embodiment, because the selection device 613 has the four channel module switch, only one train can be selected exclusively and the selection signal only for the selected train can be generated and transferred form the selection device 613 to the train control device 14.

Next, a description will be given of the operation of the plant operation apparatus as the sixth embodiment.

In order to select the A train as a target train to be operated, an operator turns the four channel module switch 672 in the selection device 613, for example. In this case, the contact corresponding to the A train is closed according to the position of the handle 671 and the contacts corresponding to other trains such as the B train, the C train, and the D train become open (namely, become OFF). It is thereby possible to select only one train exclusively and to transfer the selection signal for the selected train to the train control device 14.

As described above, according to the plant operation apparatus of the sixth embodiment, the combination of the S/W train selection function obtained by the operation display screen control device 12 and the train control device 14 and the exclusive train selection function obtained by the selection device 613 as the hardware switch (as the H/W train selection function). This configuration satisfies the single failure criteria by using the diversified train separation function formed by the S/W train selection function and the H/W train selection function.

Seventh Embodiment

Figure 12:
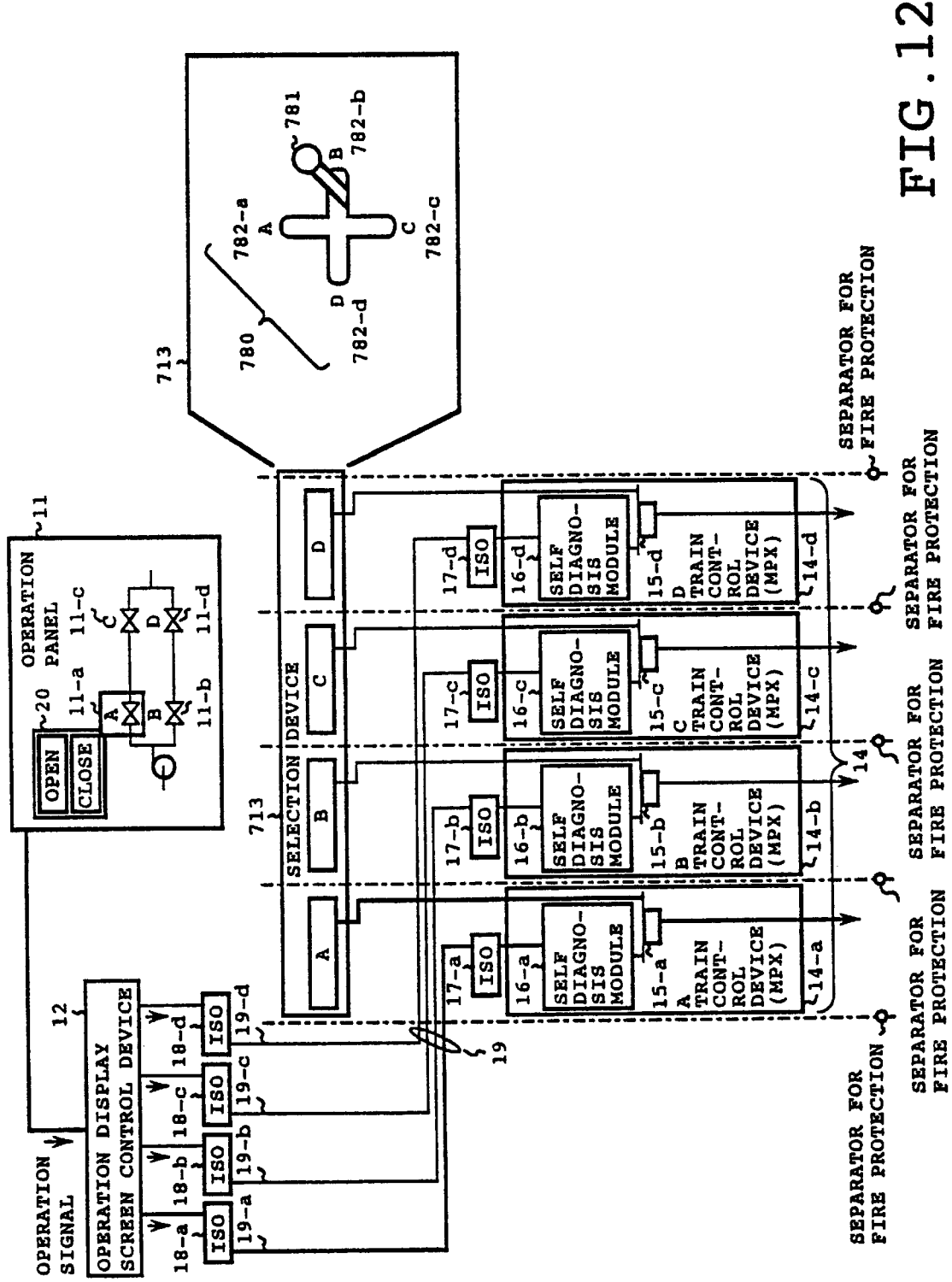
FIG. 12 is a block diagram showing a plant operation apparatus of the seventh embodiment according to the present invention.

FIG. 12 is a block diagram showing the plant operation apparatus of the seventh embodiment according to the present invention. In FIG. 12, the reference number 713 designates a selection device comprising a gear type switch 713. The reference number 713 designates a handle, 781-*a*, 781-*b*, 781-*c*, and 781-*d* denote contacts to which the position of the handle 781 is shifted by an operator when each of the A train, the B train, the C train, and the D train is selected. Other components in the plant operation apparatus of the seventh embodiment are the same as those of the plant operation apparatus of the first embodiment, therefore the explanation of them is omitted for brevity. The same numbers will be used for those same components.

In the plant operation apparatus of the seventh embodiment, because the selection device 713 comprises the gear type switch 780, only one train can be selected exclusively and the selection signal for the train selected by the gear type switch 780 can be transferred to the train control device 14.

Next, a description will be given of the operation of the plant operation apparatus as the seventh embodiment.

The operator shifts the handle of the gear type switch 780 to the position by which one train is selected exclusively. For example, when the position of the handle 781 is shifted to the contact position 782-*a*, the contact corresponding to the contact position 782-*a* is closed, so that only the A train is selected. The selection signal to select the A train is transferred to the train control device 14. In this situation, because the selection switch 713 can keep that the other contacts 782-*b*, 782-*c*, and 782-*d* are open. The occurrence of two or more contacts closing (namely, they become ON) can be avoided.

As described above, according to the plant operation apparatus of the seventh embodiment, the S/W train selection function obtained by the operation display screen control device 12 and the train control device 14, and the exclusive train selection function obtained by the selection device 713 as the hardware switch (the H/W train selection function) are combined and used commonly. This combinational configuration satisfies the single failure criteria by using the diversified train separation function formed by the S/W train selection function and the H/W train selection function.

Eighth Embodiment

Figure 13:
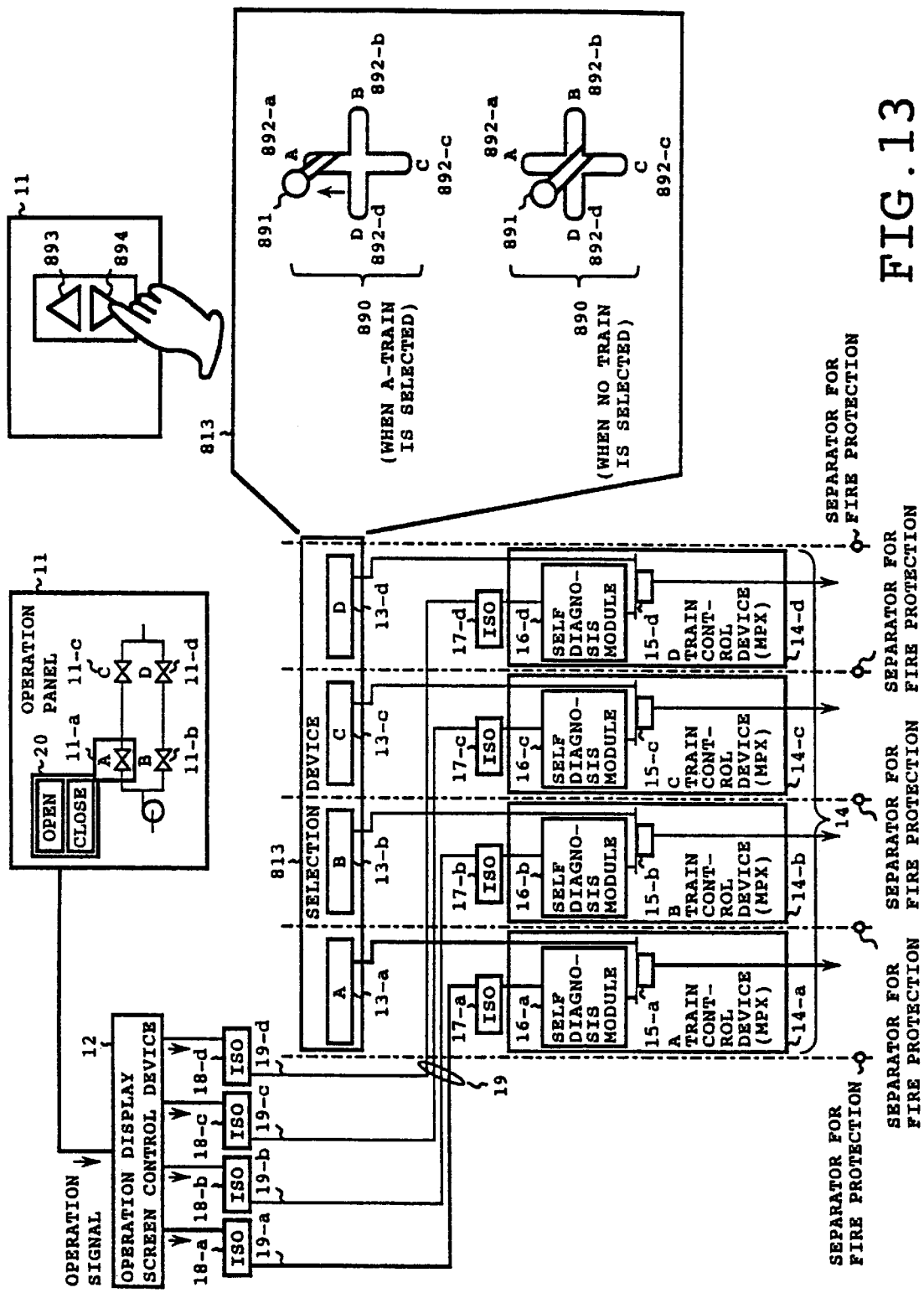
FIG. 13 is a block diagram showing a plant operation apparatus of the eighth embodiment according to the present invention.

FIG. 13 is a block diagram showing a plant operation apparatus of the eighth embodiment according to the present invention. In FIG. 13, the reference number 813 designates a selection device comprising a gear type switch 890. The reference numbers 893 and 894 denote touch buttons placed on the operation panel 11. When an operator pushes one of the buttons 893 and 894, the S/W train selection operation is performed. Other components in the plant operation apparatus of the eighth embodiment are the same as those of the plant operation apparatus of the first embodiment, therefore the explanation of them is omitted for brevity. The same numbers will be used for those same components.

In the plant operation apparatus of the eighth embodiment, because the selection device 813 comprises the gear type switch 890, only one train can be selected exclusively and the selection signal for the train selected by the gear type switch 890 can be transferred to the train control device 14. Thus, the plant operation apparatus of the eighth embodiment has the S/W train selection function obtained by the operation display screen control device 12 and the train control device 14 and the H/W train selection function obtained by the gear type switch 890 in the selection device 813. The position of the handle 891 is kept at the center position of the switch 890 as the neutral position by using a spring, as shown in the lower section of the selection device 813 in FIG. 13. When an operator selects one train to be operated, the operator shifts the handle 891 of the gear type switch 890, as the H/W train selection, to a position corresponding to the target train to be operated. In addition to this H/W train selection operation, the operator further pushes one of the touch buttons 893 and 894 on the operation panel 11 in order to select the train as the S/W train selection.

Next, a description will be given of the operation of the plant operation apparatus as the eighth embodiment.

When the operator selects no train, the position of the handle 891 is kept at the center of the gear type switch 890, as shown in the upper section of the selection device 813 in FIG. 13. For example, in order to select the A train, the operator shifts the handle 891 to the contact position 892-*a* (the top position). In addition to this operation, the operator further pushes one of the touch buttons 893 and 894 in the operation panel 11 that is controlled based on software programs. After this, the predetermined processes and operations are performed. Similarly, when selecting another train such as the B train, the C train, or the D train, the operator shifts the handle 891 to the position 892-*b*, 892-*c*, or 892-*d* corresponding to the train to be selected, and then the above operations and processes are performed.

As described above, according to the plant operation apparatus of the eighth embodiment, the combination of the S/W train selection function obtained by the operation display screen control device 12 including the operation panel 11 and the train control device 14 and the exclusive train selection function obtained by the selection device 813 as the hardware switch. This configuration achieves to satisfy the single failure criteria by using the diversified train separation function formed by the S/W train selection function and the H/W train selection function.

Ninth Embodiment

Figure 14:
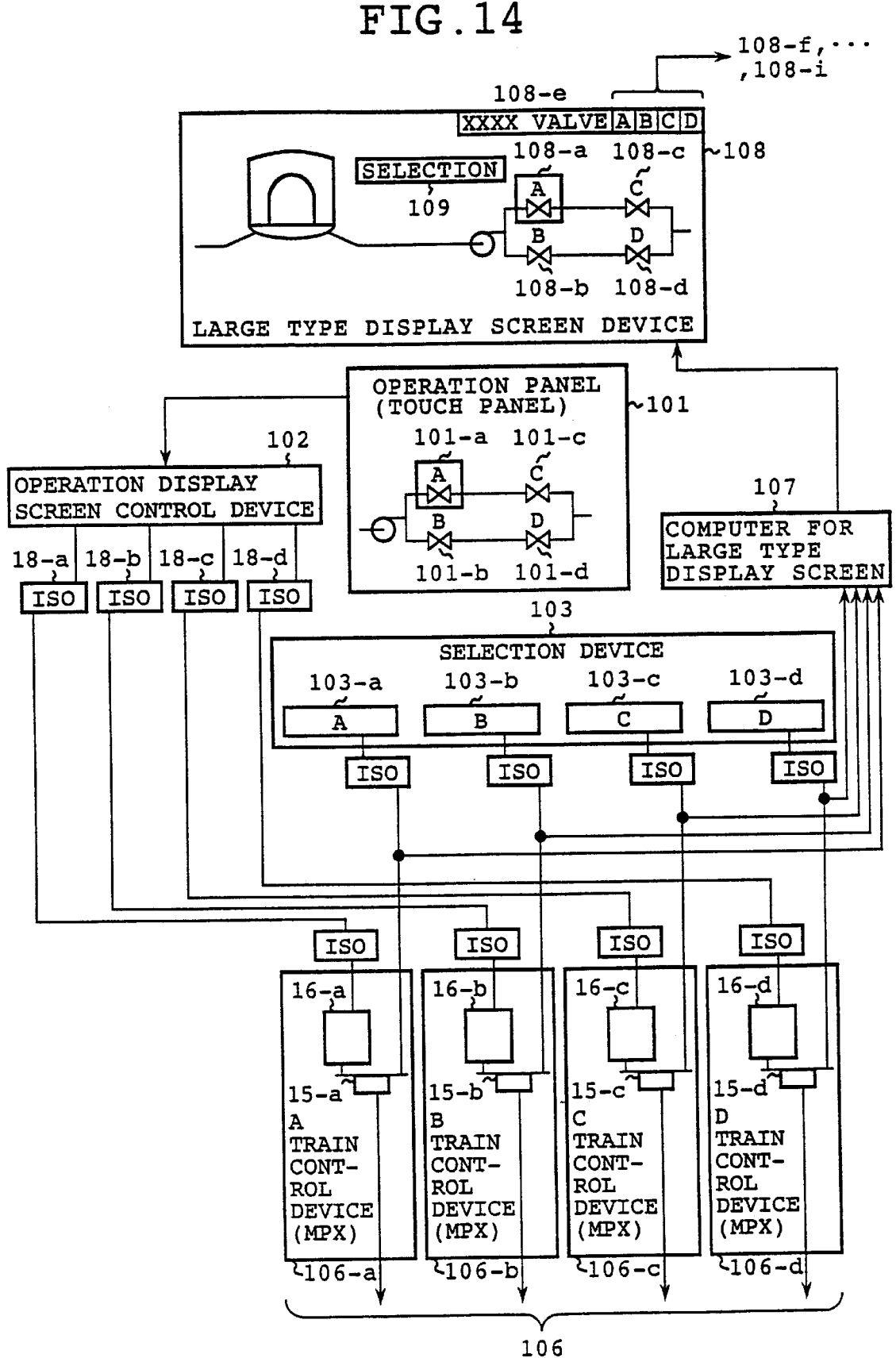
FIG. 14 is a block diagram showing a plant operation apparatus of the ninth embodiment according to the present invention.

FIG. 14 is a block diagram showing the plant operation apparatus of the ninth embodiment according to the present invention. In FIG. 14, the reference number 101 designates an operation panel by which an operator selects devices and equipments to be operated, 102 denotes an operation display screen control device, 103 indicates a selection device, 108 designates a large type display device for displaying states of trains, 107 denotes a computer for calculating data items to be displayed on the large type display device 108. The reference character ISO designates an isolator as a separation device. FIG. 14 shows a plurality of ISOs. Other components in the plant operation apparatus of the ninth embodiment are the same as those of the plant operation apparatus of the first embodiment, therefore the explanation of them is omitted for brevity. The same numbers will be used for those same components.

In the plant operation apparatus of the ninth embodiment, the large type display device 108 is incorporated. On the large type display device 108, the name of the train selected by the operation panel 101 as the S/W selection device and the train information selected by the selection device 103 as the H/W selection device are displayed simultaneously. Many operators can observe the train information displayed on the large type display device 108. This causes that many operators have the same information regarding the selected train and so on and this avoids operation errors or reduce occurrences of the operation errors caused in the train selection operation by the operators.

Next, a description will be given of the operation of the plant operation apparatus as the ninth embodiment.

When the operator operates the operation panel 101 to select one train, the selected train information is displayed on the large type display device 108. For example, as shown in FIG. 14, the name and states 108-*a*, 108-*b*, 108-*c*, and 108-*d* of the devices in the selected train is displayed on the large type display device 108 under the control of the computer 107 for the large type display device 108. Furthermore, the states of the train selected by the selection device 103 as the H/W selection device are displayed on the displays 108-*f* to 108-*i* (omitted from FIG. 14 for brevity) in the large type display device 108. In addition, messages such as the operation states, the selection states, the rectangular symbol 108, the character "selection", and the like are displayed on corresponding positions on the large type display device 108.

As described above, according to the plant operation apparatus of the ninth embodiment, operation information including the states of the devices in the selected train and the operation states processed by operators can be displayed on the large type display device. It is possible for the operators to have the same information to each other. This reduces occurrences of operation errors in the train selection operation.

Tenth Embodiment

Figure 15:
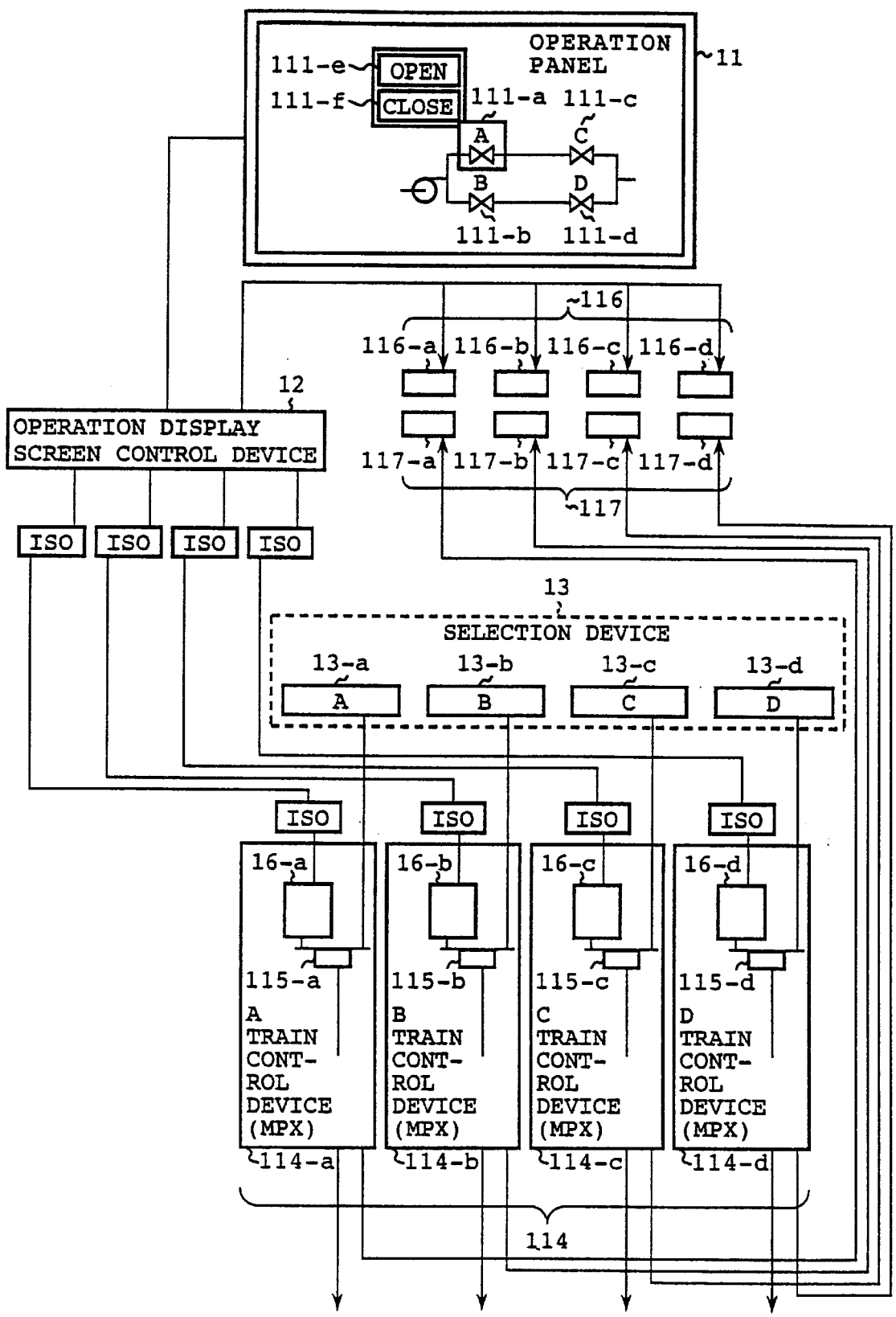
FIG. 15 is a block diagram showing a plant operation apparatus of the tenth embodiment according to the present invention.

FIG. 15 is a block diagram showing a plant operation apparatus of the tenth embodiment according to the present invention. In FIG. 15, the reference number 114 designates a train control device including the A train control device 114-*a* for controlling the operation of the A train, the B train control device 114-*b* for controlling the operation of the B train, the C train control device 114-*c* for controlling the operation of the C train, and the D train control device 114-*d* for controlling the operation of the D train. The reference numbers 115-*a*, 115-*b*, 115-*c*, and 115-*d* denote AND circuits incorporated in each corresponding train control device, respectively. The reference numbers 116-*a*, 116-*b*, 116-*c*, and 116-*d* indicate selection train indicating lamps or pilot lamps for indicating the train selection state. The reference numbers 117-*a*, 117-*b*, 117-*c*, and 117-*d* designate control train pilot lamps indicating the available trains to be selected. The operation of each of the train control devices 114-*a*, 114-*b*, 114-*c*, and 114-*d* and the AND circuits 115-*a*, 115-*b*, 115-*c*, and 115-*d* is the same as that of the train control circuit 14 and the AND circuit 15 in the plant operation apparatus of the first embodiment. Other components in the plant operation apparatus of the ninth embodiment are the same as those of the plant operation apparatus of the first embodiment, therefore the explanation of them is omitted for brevity. The same numbers will be used for those same components.

In the plant operation apparatus of the tenth embodiment, the train selection pilot lamp 116 corresponding to the selected train lights up. The control train pilot lamps 117 corresponding to the available trains to be selected light up. This reduces occurrences of the operation error and facilitates correct train selection operation.

Next, a description will be given of the operation of the plant operation apparatus as the tenth embodiment.

In the operation panel 11, when the operator selects the device to be operated in the A train, for example, the operation display screen control device 12 transfers a control signal to the corresponding pilot lamp 116-*a*. Then the selection train pilot lamp 116-*a* lights up. When the operator pushes the selection button 13-*a* in the selection device 13 for the A train, it becomes possible to operate the A train actually. The train control device 114 then transfers a control signal to the control train pilot lamp 117-*a*. The control train pilot lamp 117-*a* lights up to indicate that the A train is available to operate. In this situation, it is possible to operate the push buttons 111-*e*, 111-*f*, and so on, as the S/W operation means, for the selected A train.

As described above, according to the plant operation apparatus of the tenth embodiment, the selection train pilot lamp 116 corresponding to the selected train lights up and the control train pilot lamps 117 light up to show the available train states to be operated. It is thereby possible to reduce the operator load caused when the operators select the train and to easily perform correctly the train selection operation.

Eleventh Embodiment

Figure 16:
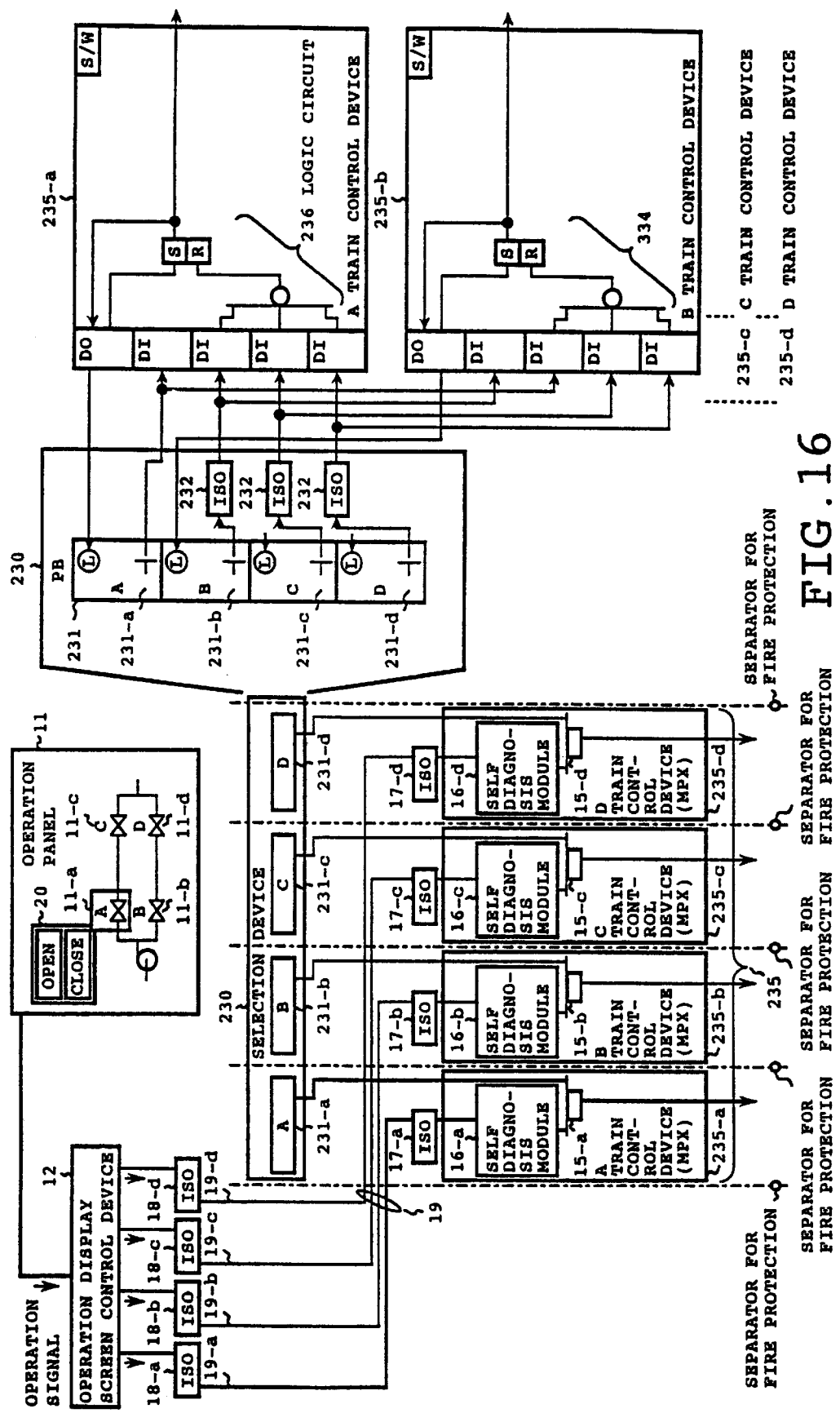
FIG. 16 is a block diagram showing a plant operation apparatus of the eleventh embodiment according to the present invention.

FIG. 16 is a block diagram showing the plant operation apparatus of the eleventh embodiment according to the present invention. In FIG. 16, the reference number 235 designates a train control device comprising the train control devices 235-*a*, 235-*b*, 235-*c*, and 235-*d* corresponding to the A train, the B train, the C train, and the D train, respectively. The reference number 236 designates a logic circuit forming each of the train control devices 235-*a*, 235-*b*, 235-*c*, and 235-*d*. The reference number 230 denotes a selection device as a H/W selection device comprising train selection switch 231-*a*, 231-*b*, 231-*c*, and 231-*d*. Other components in the plant operation apparatus of the eleventh embodiment are the same as those of the plant operation apparatus of the second embodiment, therefore the explanation of them is omitted for brevity. The same numbers will be used for those same components.

In the plant operation device of the eleventh embodiment, when an operator wants to push one train selection switch in the selection device 230, even if the operator pushes other train selection switch in a mis-operation or a failure operation, the logic circuit 236 in the train control device 235 can prevent wrong or failure output of the train selection signal from the train control device 235.

Next, a description will be given of the operation of the plant operation apparatus as the twelfth embodiment.

When an operator wants to push the selection switch 231-*a* in order to select the A train and the operator pushes other selection switch 231-*b*, 231-*c*, or 231-*d* other than the desired selection switch 231-*a*, the failure operation or the mis-operation occurs. In this situation, the logical circuit 236 incorporated in each of the train control device 235-*a* to 235-*d* prevents to output any wrong selection signal from the train control device 235 caused by the mis-operation. Like the operation of the plant operation apparatus of the second embodiment, in the plant operation apparatus of the eleventh embodiment, the selection signal is transferred from the train control device 235 only when an operator pushes momentarily the train selection switch, namely the push button, in the selection device 230 as the H/W selection device and the operator operates the operation panel 11 as the S/W selection device.

As described above, according to the plant operation apparatus of the eleventh embodiment, even if a mis-operation occurs, for example, an operator pushes the train selection switch corresponding to the selected train and one or more other train selection switches simultaneously, the logical circuit can prevents output of a selection signal from the train control device 235.

Accordingly, the combination of the train selection operation as the S/W train selection by the operation panel 11 and the operation display screen device 12, and the exclusive train selection operation as the H/W train selection operation by the selection device 230 is performed, so that it is possible to satisfy the single failure criteria by using the diversified train separation function.

Twelfth Embodiment

Figure 17:
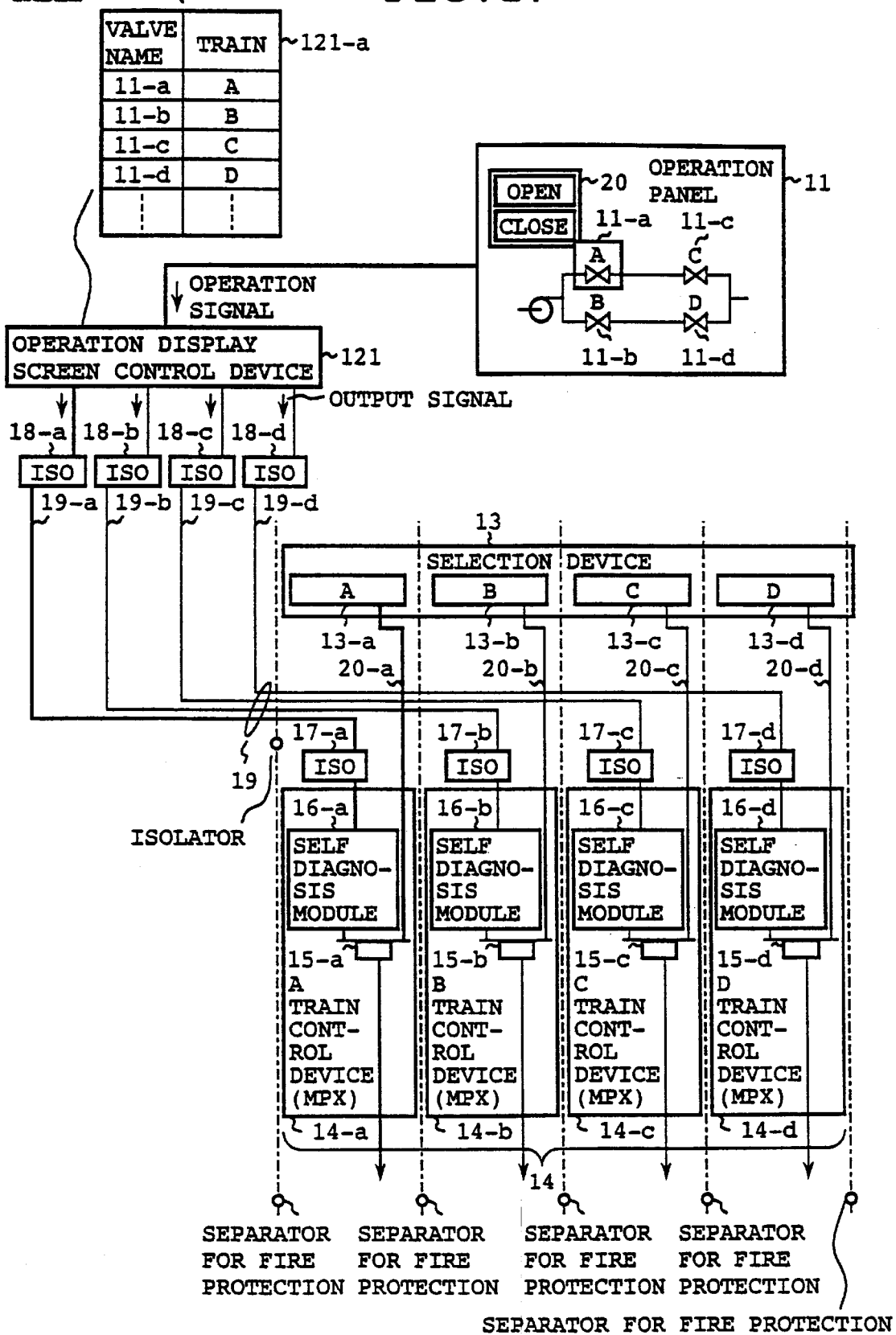
FIG. 17 is a block diagram showing a plant operation apparatus of the twelfth embodiment according to the present invention.

FIG. 17 is a block diagram showing the plant operation apparatus of the twelfth embodiment according to the present invention. In FIG. 17, the reference number 121 designates an operation display screen device, and 121-*a* denotes a train identification table. Other components in the plant operation apparatus of the twelfth embodiment are the same as those of the plant operation apparatus of the second embodiment, therefore the explanation of them is omitted for brevity. The same numbers will be used for those same components.

For example, in the plant operation apparatus of the first embodiment, when an operator operates the operation panel 11, information such as the name of a target device to be operated, an operation content, a train name in which the target device belongs, and the like is transferred as the operation signal to the operation display screen control device 121. The operation display screen control device 121 receives the operation signal from the operation panel 11 and judges the train control device for the train including the target device to be operated based on the received operation signal.

On the other hand, in the plant operation apparatus of the twelfth embodiment, only the name of the target device to be operated and the operation content are transferred from the operation panel 11 to the operation display screen control device 121 as the operation signal. The operation display screen control device 121 receives the operation signal and then obtains the control information belonging to the selected train by using the received operation signal and the train identification table 121-*a*.

In the plant operation apparatus of the twelfth embodiment, the information including only the target device and the operation content is transferred from the operation panel 11 to the operation display screen control device 121 as the operation signal. Then the operation display screen control device 121 obtains the information for the selected train to which the target device belongs by using the train identification table 121-*a*.

Next, a description will be given of the operation of the plant operation apparatus as the twelfth embodiment.

When an operator operates the operation panel 11, the operation panel 11 generates and transfers the operation signal including information about only a target device and an operation content. The operation display screen control device 121 receives the operation signal from the operation panel 11 and decides and generates the control information regarding the train in which the target device to be operation is included by using the train identification table 121-*a* and then transfers the selection signal as the control information to the corresponding to the train control device. In this train identification table 121-*a*, target device numbers that are unique in a plant correspond to the information for trains to which the target devices belong. Based on this identification table 121-*a*, the plant display screen control device 121 judges the train control device from which the control signal is transferred to the selected train in which the target device to be operated belongs. It is not necessary to have the function of judging which information corresponds to a train. This causes to reduce the design load for the plant operation apparatus.

As described above, according to the plant operation apparatus of the twelfth embodiment, the operation panel 11 generates and transfers the information only including a target device to be operated and an operation content, as the S/W train selection operation, to the operation display screen control device 121. The operation display screen control device 121 can obtain the train information regarding the target device based on the train identification table 121-*a*. Accordingly, it is possible to design the operation panel which has no function of each information belonging to each train. This reduces the design load for the plant operation apparatus.

Thirteenth Embodiment

Figure 18:
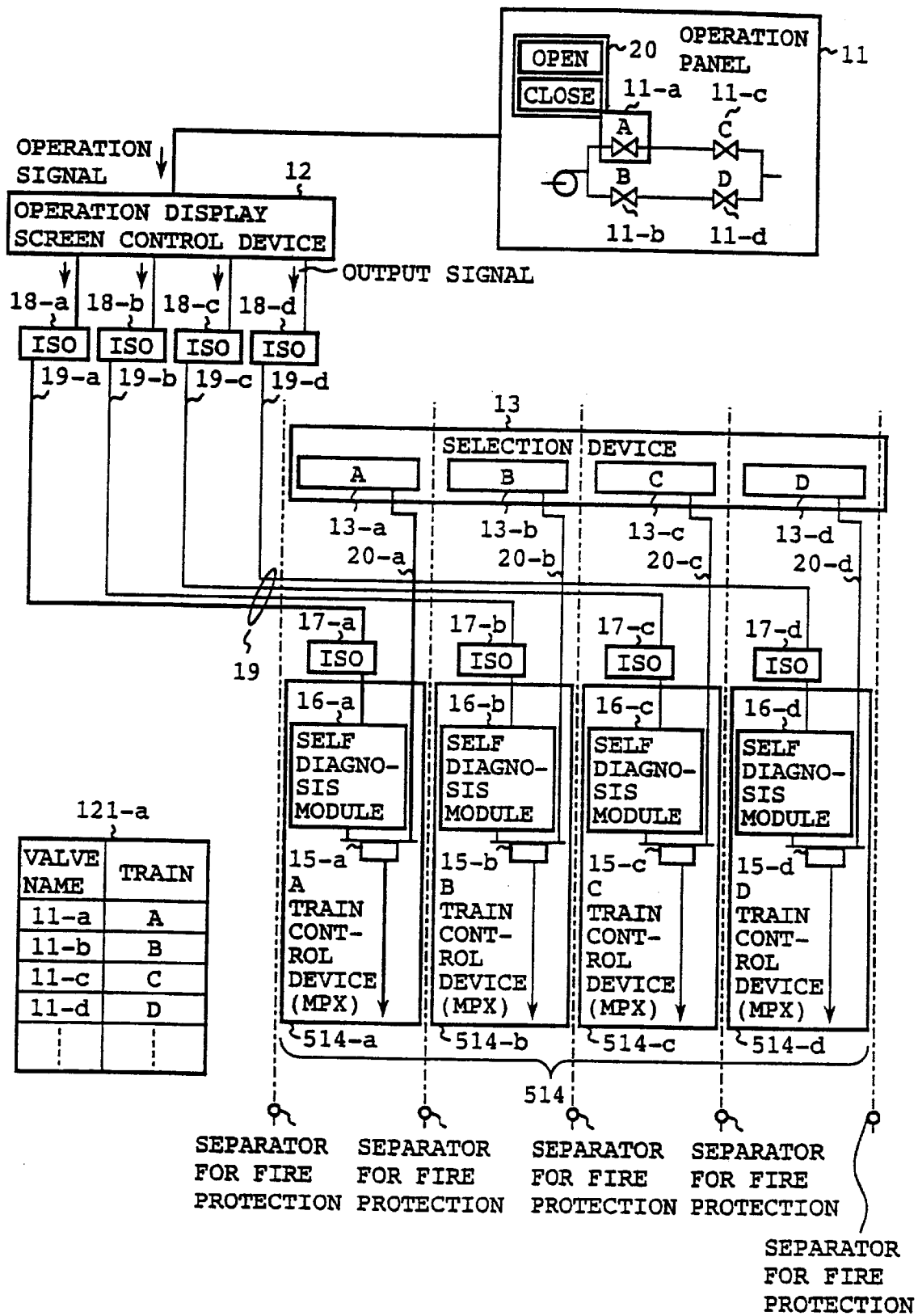
FIG. 18 is a block diagram showing a plant operation apparatus of the thirteenth embodiment according to the present invention.

FIG. 18 is a block diagram showing the plant operation apparatus of the thirteenth embodiment according to the present invention. In FIG. 18, the reference number 514 designates a train control device comprising the A train control device 514-*a* for controlling the operation of the A train, the B train control device 514-*b* for controlling the operation of the B train, the C train control device 514-*c* for controlling the operation of the C train, and the D train control device 514-*d* for controlling the operation of the D train. The reference character 121-*a* denotes a train identification table stored in each of the train control devices 514-*a*, 514-*b*, 514-*c*, and 514-*d*. The contents of this train identification table is the same of that of the train identification table in the operation display screen device 121 in the twelfth embodiment shown in FIG. 17.

Other components in the plant operation apparatus of the thirteenth embodiment are the same as those of the plant operation apparatus of the first embodiment, therefore the explanation of them is omitted for brevity. The same numbers will be used for those same components.

For example, in the plant operation apparatus of the first embodiment, when an operator operates the operation panel 11, information such as the name of a target device to be operated, an operation content, a train name in which the target device belongs, and the like is transferred as the operation signal to the operation display screen control device 12. The operation display screen control device 12 receives the operation signal from the operation panel 11 and judges the train control device for the train including the target device to be operated based on the received operation signal.

On the other hand, in the plant operation apparatus of the thirteenth embodiment, only the name of the target device to be operated and the operation content are transferred from the operation panel 11 to the operation display screen control device 12 as the operation signal, and further transferred from the operation display screen control device 12 to the train control device 514 as the output signals including train control device selection information.

In the plant operation apparatus of the thirteenth embodiment, the information including only the target device and the operation content is transferred from the operation panel 11 to the operation display screen control device 12 as the operation signal and then transferred from the operation display screen control device 12 to the train control device 514 as the output signals including train control device selection information. Then the train control device 514 obtains various control information for the selected train to which the target device belongs by using the train identification table 121-*a* stored in each of the train control devices 514-*a*, 514-*b*, 514-*c*, and 514-*d*.

Next, a description will be given of the operation of the plant operation apparatus as the thirteenth embodiment.

When an operator operates the operation panel 11. The operation panel 11 generates and transfers the operation signal including information about only a target device to be operated and an operation content. The operation display screen control device 121 receives the operation signal from the operation panel 11 and transfers the output signals including train control device selection information to the train control device 514. The train control device 514 receives the output signals and then decides and generates the control information regarding the train in which the target device to be operation is included by using the train identification table 121-*a*. Then one of the train control devices 514-*a*, 514-*b*, 514-*c*, and 514-*d* in the train control device 514 controls the operation of the target device in the corresponding train. In this train identification table 121-*a*, target device numbers that are unique in a plant correspond to the information for trains to which the target devices belong. Based on this identification table 121-*a*, the train control device 514 judges the corresponding train in which the target device to be operated belongs. It is not necessary for the operation panel 11 and the operation display screen control device 12 to have the function of judging which information corresponds to a train. This causes to reduce the design load for the plant operation apparatus.

As described above, according to the plant operation apparatus of the thirteenth embodiment, the operation panel 11 generates and transfers the information only including a target device to be operated and an operation content, and the operation display screen control device 12 generates and transfers information other than the assigned train information to the train control device 514. The train control device 514 decides and generates the control information regarding the train in which the target device to be operated is included by using the train identification table 121-*a*, as the S/W train selection operation. Accordingly, it is possible to design the operation panel 11 and the operation display screen control device 12 having no function of each information belonging to each train. This causes to reduce the design load for the plant operation apparatus.

As described in detail, the plant operation apparatus of the present invention is designed based on the train selection separation method in which the operation panel as a train selection means to which a design of the separation function is required is formed based on the software (S/W) train selection function and the selection device including a train selection switch as a hardware (H/W) selection means is formed based on the H/W train selection function. It is thereby to integrate or combine operation panels in the plant operation apparatus, so that the operator's operation can be performed easily. On the other hand, although the working amount of operators in the train selection operation is increased, it is possible to reduce occurrences of operation errors caused by the operators, devices, and equipment.

Here, a description will be given of the functions of the plant operation apparatus according to the present invention. When we consider the viewpoint of the single failure criteria required in any safety system for atomic power plants, the components forming the plant operation apparatus of the present invention such as (1) FDP (the operation panel), (2) FDP controller (operation display screen control device), (3) train selection switches (selection device), and the like must satisfy the single failure criteria.

Here, the influence caused when those components (1) to (3) break down will be explained and it will be explained that the plant operation apparatus of the present invention satisfies the separation function based on the single failure criteria.

(1) FDP (operation panel)

When a mis-operation caused in devices other than the controller in the touch panel occurs and an incorrect signal other than the operation signal with a normal data format and a -normal transmission protocol is transferred from the operation panel, the FDP controller halts to receive the wrong signal. Thus, it is possible to prevent the influence of the mis-operation caused in the operation panel by the FDP controller because the FDP controller can detect this type failure. As a failure affecting to the FDP controller, there is a mis-operation signal with the normal transmission protocol. In this case, any operator does not find the occurrence of the failure. Specifically speaking, for example, when an operator touches another touch button not to be desired, an incorrect signal including an identification symbol in the display screen and a touch position information is generated and transferred to other devices. In this case, the plant operation apparatus according to the present invention has the configuration so that it can be prevented to push or active two or more train selection switches simultaneously. Therefore the operation for plant equipments can be limited to only the selected train. In addition, the effects caused by an electrical failure and a fire failure can be prevented by incorporating isolators. Each isolator is covered with a fire protection metal shield and isolated electrically from other, at the output section of the FDP controller.

(2) FDP controller

Because the FDP controller comprises a microcomputer having a central processing unit, it is possible to perform a self diagnosis in the FDP controller for various failures. From the view point of the design of the FDP controller, it is difficult to generate and transfer any incorrect signals. Even if an incorrect signal is generated in the FDP controller, it is possible to detect the generated incorrect signal and to prevent the transmission of this incorrect signal by the same reason (1) described above. In this case, because the plant operation apparatus of the present invention has the configuration so that pushing or activating two or more train selection switches simultaneously can be prevented. Therefore the influences of the failure is limited within one train by the multiplexer (MPX) such as the train control device. In addition, failures caused by an electrical failure and a fire failure can be prevented by incorporating isolators, each covered with a fire protection metal shield and isolated electrically from each other, at the output section of the FDP controller.

(3) Train selection switch

The plant operation apparatus of the present invention can prevent output of a mis-operation signal because the plant operation apparatus has both the software train selection function and a hardware train selection function, even if an incorrect train selection signal is generated and transferred caused by the failure of the train selection switches. Therefore there is no influences of the failure in the plant operation apparatus according to the present invention.

As described above in detail, according to embodiments of the present invention, a plant operation apparatus for satisfying a separation criteria comprises an operation panel including panel switches for common touch operation, for generating operation signal based on the touch operation by operators, and for transferring the operation signal, an operation display screen control device for controlling a display on the operation panel and the touch operation when one of a plurality of trains as equipments placed in a safety protection system being selected, each train being separated independently in order to keep a multiplicity, a diversity, and an independence of supervision operation devices in the safety protection system, the operation display screen control device for selecting one train based on a software selection function according to the operation signal from the operation panel, and for generating a first control signal for the selected train, a selection device comprising momentary type push buttons corresponding to the trains, for resetting other push buttons other than one push button that being pushed by an operator based on a hardware selection function, and for generating and transferring a second control signal corresponding to the selected train, and a train control device for receiving the first control signal and the second control signal transferred from the operation display screen control device and the selection device, for generating a third control signal for the selected train based on both the first control signal and the second control signal, and for transferring the third control signal to the selected train. Furthermore, in the plant operation apparatus, the operation display screen control device, the selection device, and the train control device forms a diversified train selection system satisfying the separation criteria. Thereby, the present invention has the effect to prevent an occurrence of a mis-operation.

Furthermore, according to a refinement of the present invention, the plant operation apparatus is formed so that the selection device comprises self diagnosis circuits, each self diagnosis circuit corresponds to each train, and the selection device resets the self diagnosis circuits, based on a software logic function, corresponding to the push buttons for other trains, that are not selected when the operator pushes one of the push buttons in order to select one train. Therefore the present invention has the effect that it is possible to prevent an occurrence of a mis-operation caused by an operator.

Moreover, according to a refinement of the present invention, the plant operation apparatus is formed so that the selection device further comprises isolators as separation devices corresponding to each train. Therefore the present invention has the effect that it is possible to form the train selection system independently from the control device and to reduce a wiring design load.

Furthermore, according to a refinement of the present invention, the plant operation apparatus has the configuration in which the push buttons incorporated in the selection device are mechanical reset type push buttons, and the mechanical reset type push buttons corresponding to other trains that are not selected are reset mechanically when one train is selected. Therefore the present invention has the effect that it is possible to prevent an occurrence of a mis-operation caused by an operator.

In addition, according to a refinement of the present invention, the plant operation apparatus is formed so that the push buttons incorporated in the selection device are alternate type push buttons, and one alternate type push button corresponding to one train to be selected is pushed after the alternate type push buttons corresponding to other trains that are not selected are reset manually. Therefore the present invention has the effect that it is possible to prevent an occurrence of a mis-operation caused by an operator.

Furthermore, according to a refinement of the present invention, the plant operation apparatus is formed so that the selection device comprises a module switch having a plurality of channels, and the module switch is formed so that only one channel corresponding to one train is selected. Therefore the present invention has the effect that it is possible to prevent an occurrence of a mis-operation caused by an operator.

Furthermore, according to a refinement of the present invention, the plant operation apparatus is formed so that the selection device comprises a mechanical gear type switch, and the mechanical gear type switch is formed so that only one channel corresponding to one train is selected. Therefore the present invention has the effect that it is possible to prevent an occurrence of a mis-operation caused by an operator.

Moreover, according to a refinement of the present invention, the plant operation apparatus is formed so that the mechanical gear type switch incorporated in the selection device keeps a neutral position while no train is selected. Therefore the present invention has the effect that it is possible to prevent an occurrence of a mis-operation caused by an operator.

In addition, according to a refinement of the present invention, the plant operation apparatus further comprises a large type display device for displaying operation information such as train selection states and the like to a plurality of operators simultaneously and a computer for controlling a display of the operation information on the large type display device, wherein the plurality of operators in charge of the train selection operation see the train selection information simultaneously displayed on the large type display device, in order to prevent occurrence of a mis-operation caused by the plurality of operators. Therefore the present invention has the effect that it is possible to prevent an occurrence of a mis-operation caused by an operator.

Furthermore, according to a refinement of the present invention, the plant operation apparatus further comprises train pilot lamps for indicating the train selection state based on the train selection information output from the operation display screen control device, and control train pilot lamps for indicating the train selection state based on the train selection information output from the selection device, wherein it is possible to prevent occurrences of a mis-operation by selecting a target train to be selected while the operator sees the train selection state in which the selection train pilot lamp corresponding to the selected train lights. Therefore the present invention has the effect that it is possible to prevent an occurrence of a mis-operation caused by an operator.

Moreover, according to a refinement of the present invention, the plant operation apparatus is formed so that the operation display screen device controls a display of a flow diagram of a plant system displayed on the operation panel so that a selection state of a target plant device to be operated in the selected train is displayed near the target plant device on the flow diagram. Therefore the present invention has the effect that it is possible to prevent an occurrence of a mis-operation caused by an operator.

Furthermore, according to a refinement of the present invention, the plant operation apparatus is formed so that the selection device comprises a logical circuit for preventing to generate and to output the selection signal even if a mis-operation, caused when the momentary type push buttons corresponding to the trains that are not selected by the operator are pushed, is happened. Therefore the present invention has the effect that it is possible to prevent an occurrence of a mis-operation caused by an operator.

Moreover, according to a refinement of the present invention, the plant operation apparatus is formed so that the operation display screen control device has a train identification table used for obtaining information of the train to be selected based on information such as a target device to be operated and operation contents included in the operation signal transferred from the operation panel, and the operation display screen control device selects the train based on the information in the train identification table. Therefore the present invention has the effect that it is possible to reduce a design load for the operation panel and to increase reliability of the train selection operation.

Furthermore, according to a refinement of the present invention, the plant operation apparatus is formed so that the train control device has a train identification table used for obtaining information of the train to be selected based on information such as a target device to be operated and operation contents included in the control signal transferred from the operation display screen control device, and the train control device selects the train based on the information in the train identification table. Therefore the present invention has the effect that it is possible to reduce a design load for the operation panel and the operation display screed control device and to increase reliability of the train selection operation.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A plant operation apparatus for maintaining plant safety when a single device fails or when a single operating error occurs, the apparatus comprising:

a plurality of trains of safety equipment independent in operation and physically separate from each other;

an operation panel, including touch-operated panel switches, for generating an operation signal based on actuation of the touch-operated switches, and for outputting the operation signal, the operation panel including a display;

an operation display screen control device for controlling the display and for selecting a first train of the plurality of trains based on a software selection function according to the operation signal from the operation panel, and for generating a first control signal for selecting the first train;

a selection device comprising a plurality of push buttons respectively corresponding to the plurality of trains, for when a first push button of the plurality of push buttons is activated, generating a second control signal for selecting a train corresponding to the first push button and for resetting remaining push buttons other than the first push button, thereby preventing the output of control signals from the selection device to trains other than the train corresponding to the first push button; and a train control device receiving the first control signal output from the operation display screen control device and the second control signal output from the selection device, for generating a third control signal for a selected train based on both the first control signal and the second control signal, and for outputting the third control signal to the selected train.

2. The plant operation apparatus as claimed in claim 1, wherein the selection device comprises a plurality of self diagnosis circuits, each of the self diagnosis circuits corresponding to a respective train, the selection device resetting the self diagnosis circuits based on a software logic function corresponding to the push buttons for trains not selected when an operator pushes one of the push buttons to select one train.

3. The plant operation apparatus as claimed in claim 2, wherein the selection device further comprises isolators corresponding to each train.

4. The plant operation apparatus as claimed in claim 1, wherein the push buttons in the selection device are mechanically reset push buttons, and the mechanically reset push buttons corresponding to trains that are not selected are reset mechanically when a train is selected.

5. The plant operation apparatus as claimed in claim 1, wherein the push buttons in the selection device are alternate push buttons, and one alternate push button corresponding to a train to be selected is pushed after alternate push buttons corresponding to other trains that are not selected are reset manually.

6. The plant operation apparatus as claimed in claim 1, wherein the selection device comprises a module switch having a plurality of channels, and the module switch is formed so that only one channel corresponding to one train is selected.

7. The plant operation apparatus as claimed in claim 1, wherein the selection device comprises a mechanical gear switch movable to a plurality of positions so that only one channel corresponding to one train is selected for each of the positions.

8. The plant operation apparatus as claimed in claim 7, wherein the mechanical gear switch incorporated in the selection device maintains a neutral position when no train is selected.

9. The plant operation apparatus as claimed in claim 1, further comprising:

a display device for displaying operation information including train selection states simultaneously to a plurality of operators; and a computer for controlling display of the operation information on the display device, the display device being simultaneously viewable by a plurality of operators performing train selection to prevent mis-operation by the plurality of operators.

10. The plant operation apparatus as claimed in claim 2, further comprising:

a display device for displaying operation information including train selection states simultaneously to a plurality of operators; and a computer for controlling display of the operation information on the display device, the display device being simultaneously viewable by a plurality of operators performing train selection to prevent mis-operation by the plurality of operators.

11. The plant operation apparatus as claimed in claim 3, further comprising:
- a display device for displaying operation information including train selection states simultaneously to a plurality of operators; and
- a computer for controlling display of the operation information on the display device, the display device being simultaneously viewable by a plurality of operators performing train selection to prevent mis-operation by the plurality of operators.

12. The plant operation apparatus as claimed in claim 1, further comprising:
- train pilot lamps for indicating train selection state based on train selection information output from the operation display screen control device; and
- control train pilot lamps for indicating train selection state based on train selection information output from the selection device, whereby mis-operation in selecting a target train while seeing the train pilot lamp corresponding to the selected train lighted is prevented.

13. The plant operation apparatus as claimed in claim 2, further comprising:
- train pilot lamps for indicating train selection state based on train selection information output from the operation display screen control device; and
- control train pilot lamps for indicating train selection state based on train selection information output from the selection device, whereby mis-operation in selecting a target train while seeing the train pilot lamp corresponding to the selected train lighted is prevented.

14. The plant operation apparatus as claimed in claim 3, further comprising:
- train pilot lamps for indicating train selection state based on train selection information output from the operation display screen control device; and
- control train pilot lamps for indicating train selection state based on train selection information output from the selection device, whereby mis-operation in selecting a target train while seeing the train pilot lamp corresponding to the selected train lighted is prevented.

15. The plant operation apparatus as claimed in claim 1, wherein the operation display screen device controls display of a flow diagram of a plant system displayed on the operation panel so that a selection state of a target plant device to be operated in the selected train is displayed near the target plant device on the flow diagram to prevent a mis-operation caused by an operator.

16. The plant operation apparatus as claimed in claim 2, wherein the operation display screen device controls display of a flow diagram of a plant system displayed on the operation panel so that a selection state of a target plant device to be operated in the selected train is displayed near the target plant device on the flow diagram to prevent a mis-operation caused by an operator.

17. The plant operation apparatus as claimed in claim 2, wherein the selection device comprises a logic circuit for preventing generation and output of the selection signal when a mis-operation caused when push buttons corresponding to trains not selected are pushed.

18. The plant operation apparatus as claimed in claim 5, wherein the selection device comprises a logic circuit for preventing generation and output of the selection signal when a mis-operation caused when push buttons corresponding to trains not selected are pushed.

19. The plant operation apparatus as claimed in claim 1, wherein the operation display screen control device includes train identification table used for obtaining information concerning a train to be selected based on target device to be operated and operation contents included in the operation signal transferred from the operation panel, and the operation display screen control device selects a train based on the information in the train identification table.

20. The plant operation apparatus as claimed in claim 1, wherein the train control device includes train identification table used for obtaining information concerning a train to be selected based on a target device to be operated and operation contents included in the control signal transferred from the operation display screen control device, and the train control device selects a train based on the information in the train identification table.

* * * * *